(12) United States Patent
Hayami et al.

(10) Patent No.: US 6,198,726 B1
(45) Date of Patent: Mar. 6, 2001

(54) PLURAL-LINE TERMINATING APPARATUS AND OAM PROCESSING METHOD THEREOF

(75) Inventors: Hichiro Hayami; Tadashi Hoshino, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/924,052

(22) Filed: Aug. 28, 1997

(30) Foreign Application Priority Data

Mar. 19, 1997 (JP) .................................................... 9-066397

(51) Int. Cl.⁷ .................................................... H04L 12/56
(52) U.S. Cl. ........................... 370/236; 370/395; 370/410
(58) Field of Search .................................... 370/232, 244, 370/392, 395, 397, 399, 235, 236, 410

(56) References Cited

U.S. PATENT DOCUMENTS

| | | | |
|---|---|---|---|
| 5,519,689 | * 5/1996 | Kim ........................................ | 370/232 |
| 5,696,759 | * 12/1997 | Tomonaga et al. ................... | 370/244 |
| 5,699,369 | * 12/1997 | Guha ..................................... | 714/774 |
| 5,715,237 | * 2/1998 | Akiyoshi .............................. | 370/228 |
| 5,790,525 | * 8/1998 | Ono et al. ............................. | 370/244 |

FOREIGN PATENT DOCUMENTS

| | | |
|---|---|---|
| 0 518 199 | 12/1992 | (EP) . |
| 0 674 457 | 9/1995 | (EP) . |
| 0 712 260 | 5/1996 | (EP) . |
| 0 719 067 | 6/1996 | (EP) . |
| 2 303 521 | 2/1997 | (GB) . |

* cited by examiner

*Primary Examiner*—Chau Nguyen
*Assistant Examiner*—Soon-Dong Hyun
(74) *Attorney, Agent, or Firm*—Helfgott & Karas, P.C.

(57) ABSTRACT

In a method of executing OAM processing in a plural-line terminating apparatus, a physical layer terminator converts a line signal to cells and adds a line identifier onto each cell header, the identifier specifying the line on which the cell arrived. A header converter converts a line-identifier/VPI/VCI of each cell to an identifier ICID for internal processing. An OAM processor unitarily manages data, which is necessary for OAM processing of each line, by a connection management table using the internal-processing identifier as an address, reads data from the management table based upon the ICID of the cells received from each of the lines, and executes OAM processing conforming to each line using the data that has been read.

10 Claims, 23 Drawing Sheets

FIG.5

ADDRESS GENERATOR (FOR VP CONNECTION)

| OC12C: | VPI 12bits +"00000000(8bits)" |
|---|---|
| OC3C : CELL IDENTIFICATION 2bits + | VPI 12bits +"000000(6bits)" |
| DS3 : CELL IDENTIFICATION 4bits + | VPI 12bits +"0000(4bits)" |
| DS1 : CELL IDENTIFICATION 5bits + | VPI 12bits +"000(3bits)" |

34c

ADDRESS GENERATOR (FOR VC CONNECTION)

| OC12C: | VPI 12bits + VCI(8 HIGHER ORDER bits) |
|---|---|
| OC3C : CELL IDENTIFICATION 2bits + | VPI 12bits + VCI (6 HIGHER ORDER bits) |
| DS3 : CELL IDENTIFICATION 4bits + | VPI 12bits + VCI (4 HIGHER ORDER bits) |
| DS1 : CELL IDENTIFICATION 5bits + | VPI 12bits + VCI (3 HIGHER ORDER bits) |

34d

FIRST TABLE

ADDRESS A

→ ICID (12 BITS) OF VP CONNECTION

→ BA ADDRESS (12 BITS)

34a

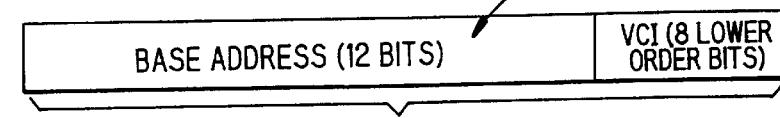

BASE ADDRESS (12 BITS) | VCI (8 LOWER ORDER BITS)

B

SECOND TABLE

ADDRESS B

→ ICID (12 BITS) OF VC CONNECTION

34b

SECOND TABLE

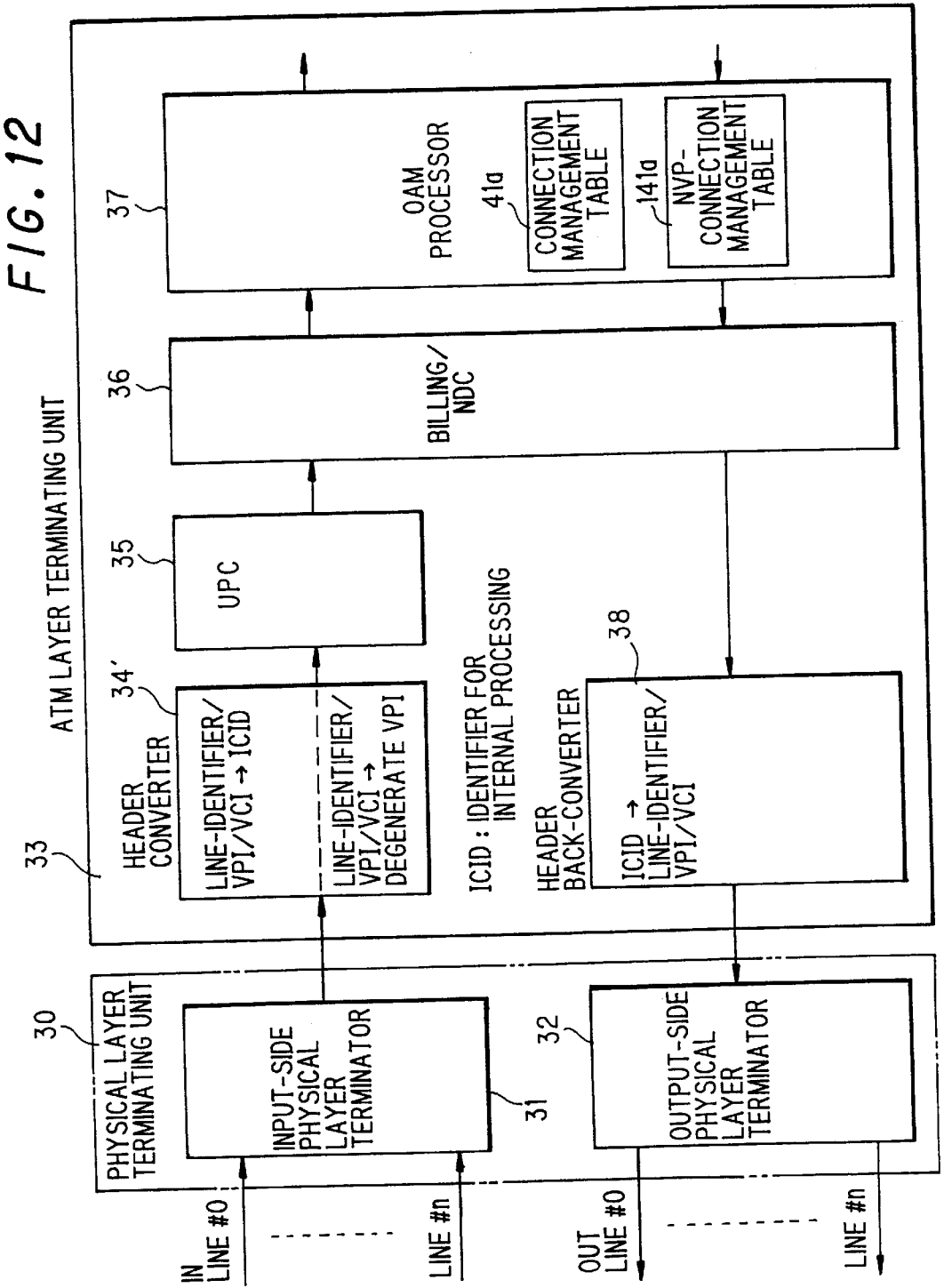

ICID ↓

| E | CE | SE | ---- | AIS | PME | PM-ID | LINE NUMBER LNI | DEGENERATE VPI |
|---|---|---|---|---|---|---|---|---|
|   |   |   |   |   |   |   |   |   |
| n | 1 |   |   |   |   |   |   | m |
|   |   |   |   |   |   |   |   |   |

CONNECTION MANAGEMENT TABLE

DEGENERATE VPI ↓

| E | ---- | AIS | PME | PM-ID | LINE NUMBER |
|---|---|---|---|---|---|
|   |   |   |   |   |   |
| m | 1 |   |   |   | #i |
|   |   |   |   |   |   |

NVP-CONNECTION MANAGEMENT TABLE

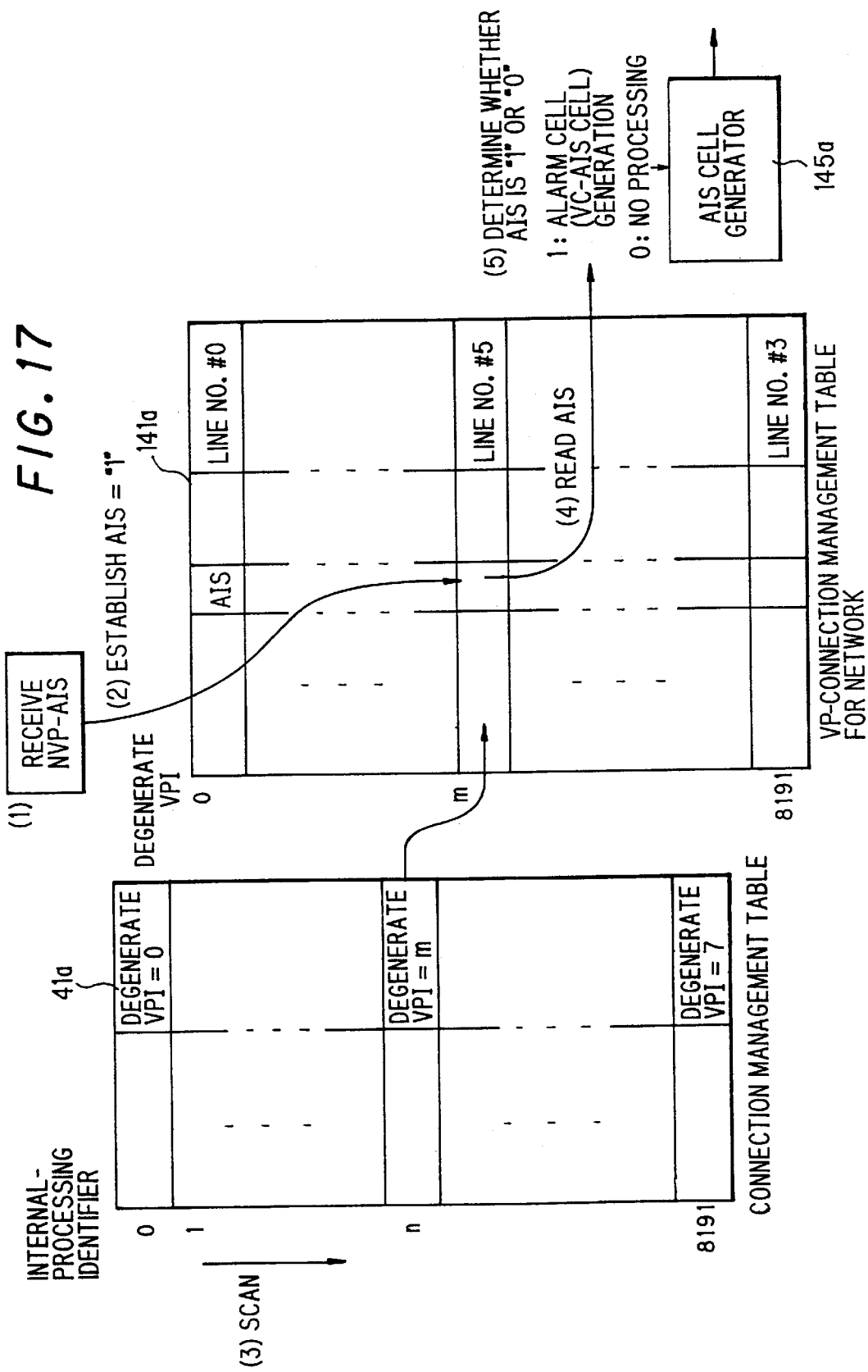

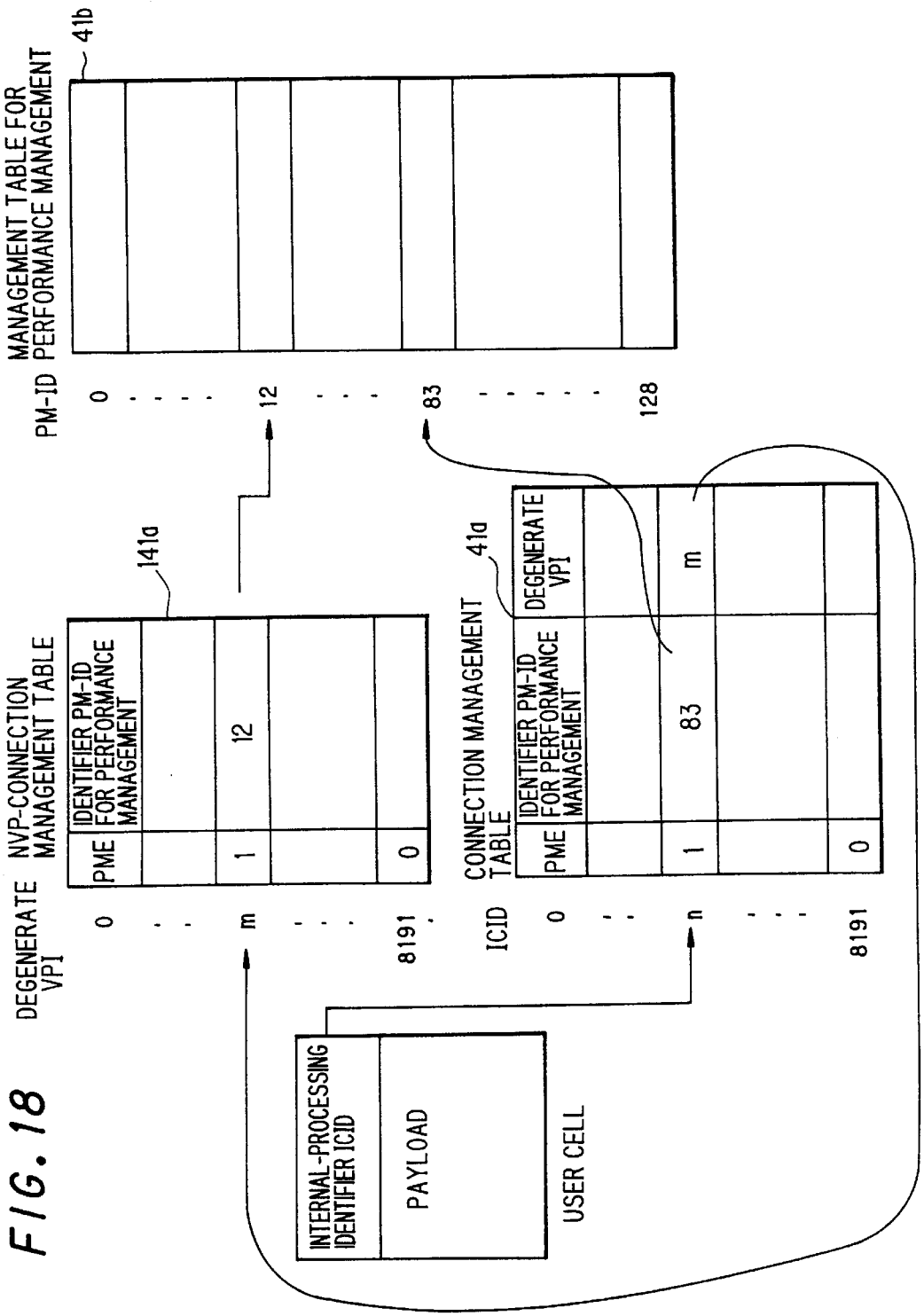

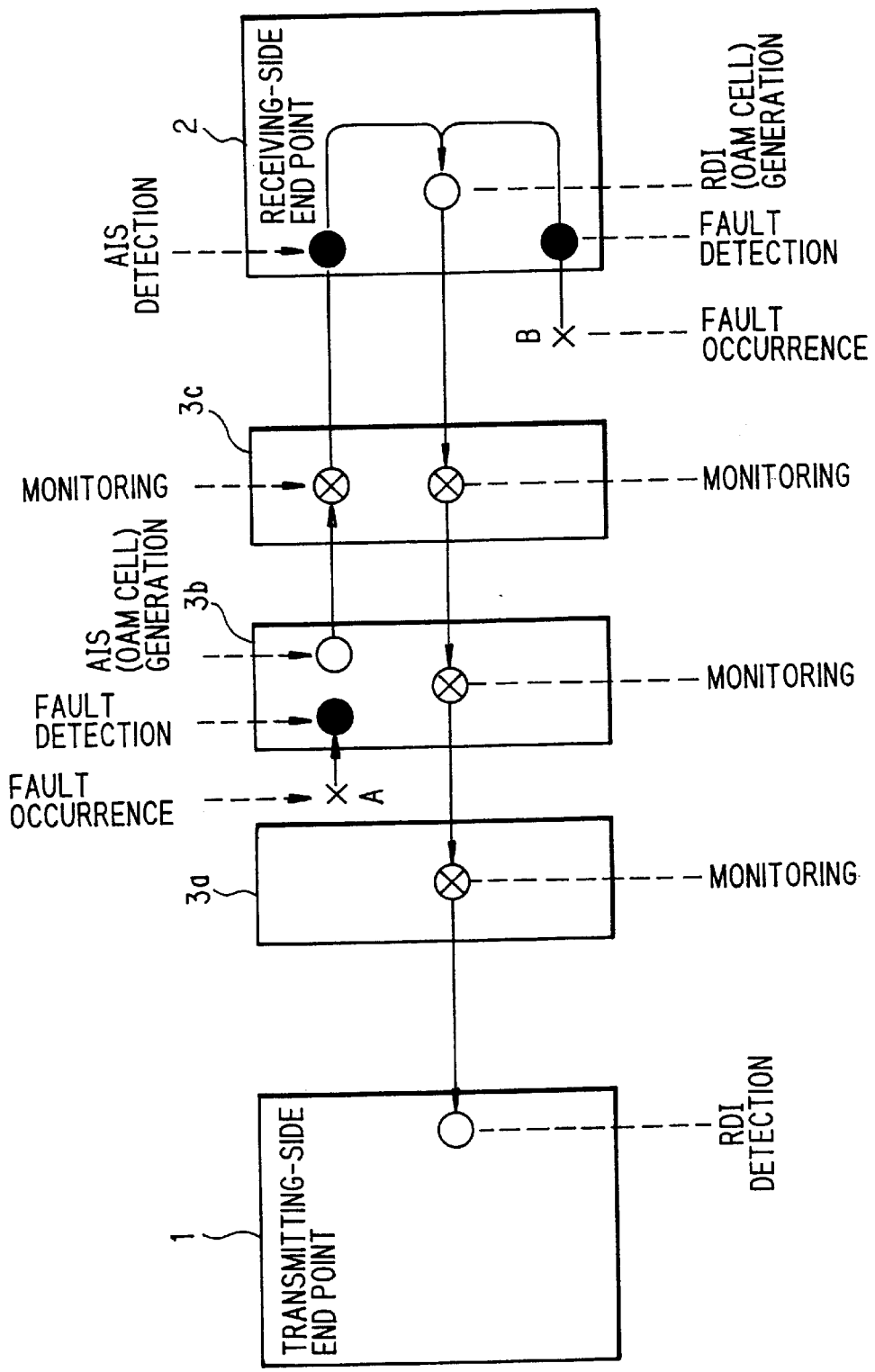

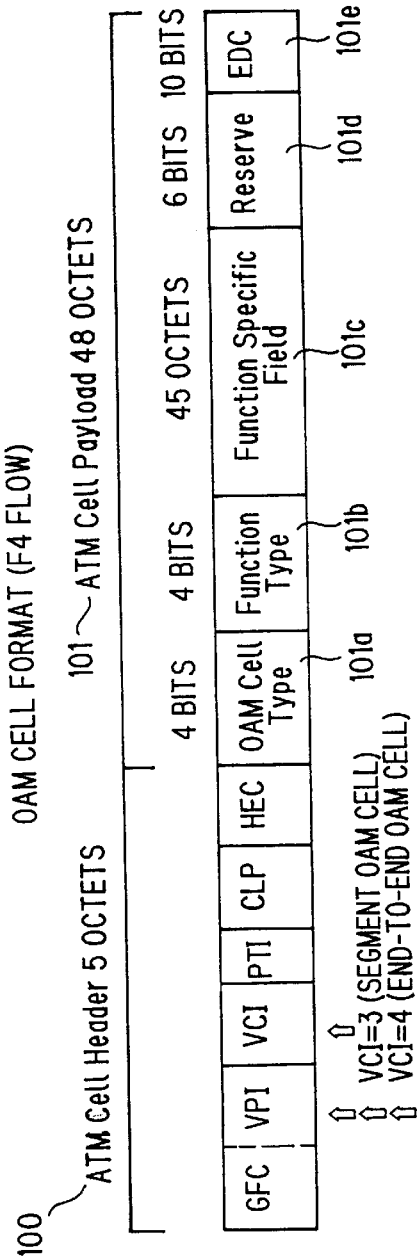
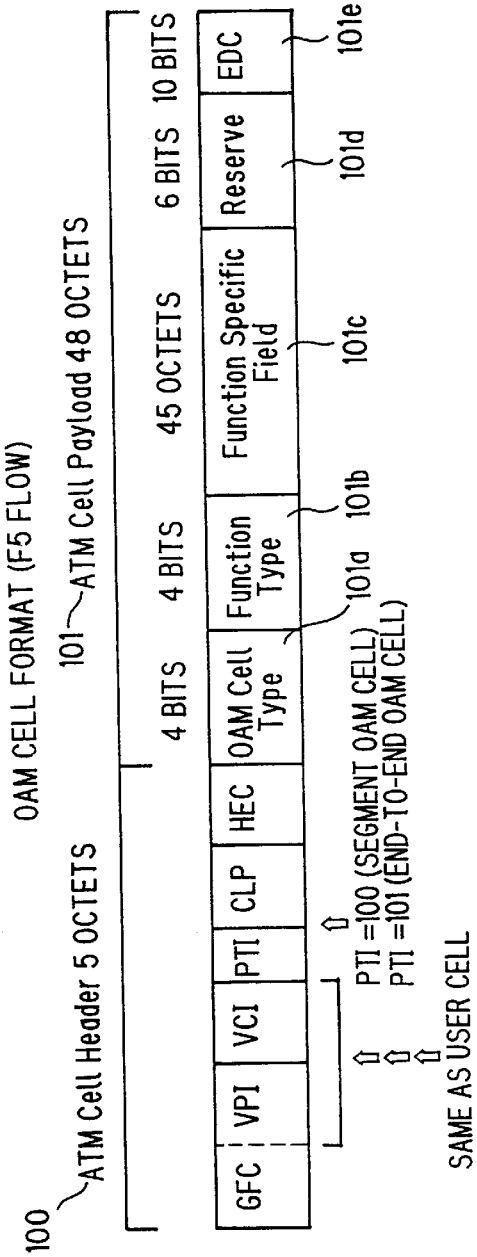

FIG.21 PRIOR ART

| CODING (101a) | | CODING (101b) | |
|---|---|---|---|
| OAM Cell Type | 4 BITS | Function Type | 4 BITS |
| Fault Management | 0001 | AIS | 0000 |
| | | RDI | 0001 |
| | | Continuity Check | 0100 |
| | | Loopback | 1000 |
| Performance Management | 0010 | Forward Monitoring | 0000 |
| | | Backward Reporting | 0001 |
| Activation/ Deactivation | 1000 | Performance Monitoring | 0000 |
| | | Continuity Check | 0001 |

PLURAL-LINE TERMINATING APPARATUS AND OAM PROCESSING METHOD THEREOF

BACKGROUND OF THE INVENTION

This invention relates to a plural-line terminating apparatus and a method of OAM processing in this apparatus. More particularly, the invention relates to a plural-line terminating apparatus for accommodating a plurality of lines, converting signals from these plurality of lines to ATM cells and sending the ATM cells to an ATM switch, sending ATM cells from the switch upon converting the cells to line signals, and executing OAM processing of a plurality of lines. The invention further relates to a method of executing this OAM processing.

Asynchronous Transfer Mode (ATM), which is the core of a broadband ISDN, makes it possible to divide a variety of information such as voice, video and data into fixed-length packets, referred to as cells, and to transfer the information over a network at high speed while handling the information in a consolidated manner. Monitoring network failures in the operation of an ATM network is important, and use is made of OAM (Operation, Administration and Maintenance) Fault Management cells (AIS cells, RDI cells, etc.) to monitor connection failure.

FIG. 19 is a diagram for describing the basic mechanism of OAM (Operation, Administration and Maintenance) flow. Shown in FIG. 19 are an end point 1 on a transmitting side, an end point 2 on a receiving side, and connecting points 3$a$, 3$b$, 3$c$ . . . at which OAM cells can be extracted/inserted. If a defect A has been sensed at a certain connecting point 3$b$, an AIS (Alarm Indication Signal) cell is sent in the downstream direction in order to notify the downstream side of the connection of the defect A. Upon receiving the AIS cell or directly detecting a defect B, the end point 2 downstream of the connection sends back an RDI (Remote Defect Indication) cell to the opposing end point on the upstream side. As a result, the end point 1 upstream of the connection is capable of managing defects on the transmitting and receiving sides in both directions, and the connecting points 3$a$~3$c$ are capable of discriminating the occurrence of defects and the locations thereof by monitoring the AIS and RDI cells.

FIGS. 20A and 20B are formats of OAM cells, in which FIG. 20A shows the format (F4 OAM flow) of an OAM cell for a VP connection and FIG. 20B the format (F5 OAM flow) of an OAM cell for a VC connection.

The F4 OAM flow implements (1) discrimination and notification of faults in a VP connection (a VP-connection fault management function), and (2) notification of error rate, cell loss rate and cell mixing rate of user information cells (a VP-connection performance management function). The F5 OAM flow implements a VC-connection fault management function and a VC-connection performance management function in a manner similar to that of the F4 flow.

The OAM cells of the F4 and F5 OAM flows both consist of a 5-octet ATM cell header 100 and a 48-octet ATM cell payload 101. The ATM cell payload 101 is composed of the following information:

(1) 4-bit OAM cell type 101$a$;
(2) 4-bit function type 101$b$;
(3) a 45-octet function specific field 101$c$, which specifies fault category and fault location;
(4) a 6-bit reserved field 101$d$; and
(5) a 10-bit ECC field 101$e$.

FIG. 21 is a correspondence table of OAM cell type 101$a$ vs. function type 101$b$. The following are advised as the OAM cell types:

fault management type (Fault Management) 0001;
performance management type (Performance Management) 0010; and
activation/deactivation management type Activation/Deactivation) 1000.

The fault management type 0001 includes (1) an alarm indication signal (AIS), which is a warning of fault detection, (2) remote defect indication (RDI), (3) continuity check and (4) loopback. The performance management type 0010 includes (1) forward monitoring and (2) backward reporting. The activation/deactivation management type includes (1) performance monitoring and (2) continuity check.

Since an OAM cell (FIG. 20A) for a VP connection traverses a path the same as that of a user cell which flows through the VP connection, the OAM cell has a VPI number the same as that of the user cell, and specific VCI values (VCI=3, VCI=4) so that the cell will be identified as an OAM cell. VCI=3 identifies the cell as being a segment OAM cell, and VCI=4 identifies the cell as being an end-to-end OAM cell. A segment OAM cell is a cell inserted/extracted in a segment and is valid only in a segment interval; it is not transmitted outside of a segment interval. An end-to-end OAM cell is a cell valid end to end of a set connection; it is discarded at the end point of a connection.

Since an OAM cell (FIG. 20B) for a VC connection traverses a path the same as that of a user cell which flows through the VC connection, the OAM cell has a VPI value and a VCI value the same as those of the user cell, and specific payload type identifiers (PTI=100,PTI=101) so that the cell will be identified as an OAM cell. PTI=100 identifies the cell as being a segment OAM cell, and PTI=101 identifies the cell as being an end-to-end OAM cell.

Thus, in a case where an AIS cell has arrived at a certain ATM connection point, the connection point undergoes a transition to an alarm state at reception of the AIS cell. Restoration to the normal state is made in response to non-reception of the AIS cell for 2.5±0.5 seconds or reception of a user cell (alarm-status recovery cell). Since the function-specific field 101$c$ of the Fault Management cell indicates the details of a fault (fault category and location, etc.), as mentioned above, at the time of a failure the maintenance personnel may operate the network by referring to the detailed information that has been recorded in the function-specific field 101$c$ of the Fault Management cell.

FIG. 22 is a block diagram illustrating the configuration of an ATM switching system. Shown in FIG. 22 are subscriber interfaces (or line IFs) $11_{11}$~$11_{1n}$, $11_{21}$~$11_{2n}$, $11_{31}$~$11_{3n}$, $11_{41}$~$11_{4n}$ connected to corresponding lines (transmission lines), multiplexer/demultiplexers $12_1$~$12_4$, an ATM switch unit 13, a system controller 14 and a maintenance terminal 15. The ATM switch unit 13 is connected to the plurality of multiplexer/demultiplexers $12_1$~$12_4$, switches input cells from certain multiplexer/demultiplexers and outputs the cells to prescribed multiplexer/demultiplexers. The multiplexer/demultiplexers $12_1$~$12_4$, which are connected to the pluralities of line interfaces $11_{11}$~$11_{1n}$, $11_{21}$~$11_{2n}$, $11_{31}$~$11_{3n}$, $11_{41}$~$11_{4n}$, respectively, multiplex incoming cells from a plurality of line interfaces IF and output the cells to the ATM switch unit 13. Furthermore, the multiplexer/demultiplexers $12_1$~$12_4$ demultiplex and output incoming cells, which arrive from the ATM switch unit 13, to the pertinent line interfaces.

The line interfaces $11_{11}$~$11_{4n}$, which are connected to the corresponding multiplexer/demultiplexers $12_1$~$12_4$, each extract an ATM cell from the payload of a frame signal of a prescribed format (e.g. a SONET frame) that has entered from the line, convert the cell to one having the cell format within the switch and output the cell to the multiplexer/demultiplexer. The cell format within the switch is provided with information TAG for routing purposes. The ATM switch unit switches a cell to a prescribed path by referring to this tag information TAG.

Furthermore, the line interfaces $11_{11}$~$11_{4n}$ convert the cells of the switch cell format that enter from the multiplexer/demultiplexers $12_1$~$12_4$ to cells having the ATM cell format, map each ATM cell to the payload of the SONET frame and send the ATM cell to the line side. The system controller 14 controls the line interfaces $11_{11}$~$11_{4n}$, multiplexer/demultiplexers $12_1$~$12_4$ and ATM switch unit 13.

FIG. 23 is a block diagram showing the construction of a line interface. One line interface 11 is provided in correspondence with one set of outgoing/incoming lines and has a one-line/one-package construction in which one line interface 11 is formed in one package. The multiplexer/demultiplexer (MUX/DMUX) and ATM switch are shown at 12 and 13, respectively.

The line interface 11 includes a physical terminator 21 for forming a frame signal having a prescribed format that has entered from the outgoing line into a cell stream and outputting the cell stream to the side of the ATM switch, and for forming a cell stream, which has entered from the side of the ATM switch, into a frame signal having the above-mentioned format and sending the frame signal to the corresponding line. A UPC (Usage Parameter Control) processor 22 performs monitoring to determine whether the reported value of transmission capacity and the actual cell inflow quantity conform. When cells in excess of the reported value flow in, processing for discarding cells in contravention of the stipulation is executed. The line interface 11 further includes a billing/NDC processor 23, which performs billing control and NDC control for counting the number of passing cells and creating billing data, and an OAM processor 24.

In a case where a line (transmission line) is constituted by e.g., an optical cable, the physical terminator 21 has an optoelectric converter for converting a light signal to an electric signal, an electro-optic converter for converting an electric signal to a light signal, and a SONET terminator. The SONET terminator deletes overhead (section overhead SOH and path overhead POH) from a frame signal having a SONET STC-3C (156 Mbps) format shown for example in FIG. 24, extracts ATM cells from the payload field PL and then converts the format to the cell format within the switch and outputs the cells. Further, the physical terminator 21 sends a cell stream, which has entered from the switch side, to the line upon converting the cell stream to a frame having the SONET STS-3C format shown in FIG. 24.

Thus, the conventional line interface has the one-line/one-package architecture. Consequently, the OAM processor 24 constituting the line interface 11 is so adapted that it executes OAM processing without being aware of the identification of the line. In other words, the OAM processor 24 executes OAM processing without being aware of the particular line via which a cell has entered and without being aware of the particular line to which a cell is output.

Accommodating a plurality of lines in a single package by use of large-scale integration and controlling the plurality of lines of the package by a single OAM processor is now in demand. In order to satisfy this demand, it is required that identification of a connection, which is possible in the prior art based solely on the VPI/VCI, include line identification as well. More specifically, it is required that the connection be identified by a VPI, VCI and line identifier. As a consequence, a connection management table that is necessary for OAM processing becomes larger in size and there is an increase in the amount of hardware.

In addition, to control a plurality of lines by a single OAM processor, it is required that OAM processing be executed upon distinguishing among the individual lines. Moreover, it is necessary to so arrange it that user cells will not be discarded owing to the band of the line being exceeded due to insertion of OAM cells.

In order to manage a line between adjacent ATM switches, there are cases where a network VP connection (NVP connection) is established for the line and line management processing is executed by sending and receiving OAM cells for the NVP connection between the adjacent ATM switches. Such an OAM cell for the NVP connection is terminated by the OAM processor of the first of the adjacent ATM switches and is not sent downstream. Therefore, in a case where the OAM cell for the NVP connection notifies of a line failure, a problem which arises is that the line failure will not be communicated to ATM switches other than these ATM switches, namely to ATM switches located downstream.

Further, in order to execute OAM processing regarding an NVP connection, it is required that a management table for the NVP connection be provided in addition to the management table for the ordinary VP/VC connections. Thus the number of management tables increases. Consequently, in a case where a plurality of lines are controlled by a single OAM processor, the capacity of the management tables increases and so does the amount of hardware.

SUMMARY OF THE INVENTION

Accordingly, an object of the present invention is to arrange it so that a plurality of lines can be controlled commonly by a single OAM processor, an increase in amount of hardware can be suppressed by reducing the capacity of a management table and OAM processing that takes lines into account can be executed efficiently.

Another object of the present invention is to so arrange it that the band will not be exceeded at each of the lines owing to insertion of OAM cells.

Another object of the present invention is to so arrange it that line failure of which notification has been given by an OAM cell for an NVP connection can be communicated also to ATM switches other than ATM switches for the NVP connection.

A further object of the present invention is to make it possible to reduce the capacity of management tables and suppress an increase in amount of hardware even in a case where OAM processing is executed separately for NVP connections and ordinary VP/VC connections.

According to the present invention, the foregoing objects are attained by providing a plural-line terminating apparatus for accommodating a plurality of lines, converting signals from these plurality of lines to cells, sending the cells to a switch, sending cells from the switch to lines upon converting the cells to line signals, and executing OAM processing of the plurality of lines, comprising (1) a first signal converter for converting a transmission line signal, which enters from each line, to cells, subsequently multiplexing the cells onto a cell stream, and adding a line identifier, which specifies the line on which the cell arrived, onto a cell header of the cell, (2) a header converter for converting a combined identifier, which is a combination of the line identifier and connection identification (VPI/VCI) added onto a cell, to an internal-processing identifier, and sending the cell having the internal-processing identifier to the switch side, (3) a header back-converter for converting the internal-processing identifier of each cell in a cell stream that has entered from the switch side back to the line identifier and connection identification, (4) a second signal converter for demultiplexing the cell stream based upon a line identifier, converting the demultiplexed cells to a transmission line signal and sending the signal, and (5) an OAM processor for unitarily managing, by a first management table and through use of the internal-processing identifier, data necessary for OAM processing of each line, reading data from the first management table based upon the internal-processing identifier of a cell received from each line, and executing OAM processing for conforming to each line using the data read. Thus, by virtue of this arrangement, a plurality of lines can be controlled commonly by a single OAM processor. Moreover, by converting a line-identifier/connection identification to an identifier for the purpose of internal processing, the capacity of the management table can be reduced and an increase in hardware can be suppressed.

Further, according to the present invention, the first signal converter is provided with means for generating, on a per-line basis, a empty cell in a period in which a valid cell is absent, adding a line identifier onto the empty cell and inserting the empty cell into the cell stream, and the OAM processor is provided with means which, when an OAM cell is sent to a prescribed line by OAM processing, is for discriminating an empty cell having the line identifier of this line from the cell stream, and inserting the above-mentioned OAM cell at the position of this empty cell. Thus, by virtue of this arrangement, OAM processing that has an awareness of the line can be executed efficiently.

Further, according to the present invention, the first signal converter is provided with means for adding an identifier onto a header of an empty cell generated by removing an overhead field of a line signal that enters from a line, and the OAM processor is provided with means for inhibiting insertion of an OAM cell at the position of the empty cell having this identifier. Thus, by virtue of this arrangement, the band will not be exceeded at each of the lines even if OAM cells are inserted.

According to the present invention, the foregoing objects are attained by providing a line terminating apparatus comprising (1) first and second management tables for storing data necessary for OAM processing of an ordinary VP/VC connection and for OAM processing of an NVP connection, respectively, (2) means for converting a line-identifier/VPI/VCI to an internal-processing identifier in case of a VP/VC connection cell and converting a line-identifier/VPI to a degenerate VPI in case of an OAM cell for an NVP connection, and (3) means for executing OAM processing of the VP/VC connection and NVP connection using data read from the first and second management tables based upon the internal-processing identifier and degenerate VPI obtained by the conversion. Thus, even in a case where an NVP connection and a VP/VC connection are subjected to OAM processing individually, the capacities of the management tables can be reduced by using the degenerate VPI and internal-processing identifier and an increase in the amount of hardware can be suppressed.

Further, the second management table, which is addressed by the degenerate VPI, is provided with an area for storing occurrence of a fault in a line corresponding to this degenerate VPI, and the first management table, which is addressed by the internal-processing identifier, is provided with an area for holding the degenerate VPI. Upon being notified of a line fault by an NVP-connection OAM cell having a prescribed degenerate VPI, the OAM processor stores the occurrence of the fault in the fault-occurrence storage area of the second table that corresponds to this degenerate VPI. The OAM processor thereafter scans the first management table to read degenerate VPIs that correspond to each of the internal-processing identifiers, determines whether occurrence of a fault has been recorded in fault-status indication areas of the second management table designated by the degenerate VPIs, and, if occurrence of a fault has been recorded, sends downstream a VC-connection OAM cell that is for giving notification of the occurrence of the fault. If this arrangement is adopted, ATM switches other than the ATM switches of NVP connections can be notified of a line defect of which notification has been given by an OAM cell for an NVP connection.

Other features and advantages of the present invention will be apparent from the following description taken in conjunction with the accompanying drawings.

BRIEF DESCRIPTION OF THE DRAWINGS

FIG. 5 is a diagram useful in describing a method of making a conversion to a connection identifier (ICID) for internal processing;

FIG. 12 is a block diagram showing the construction of a line interface according to the second embodiment;

FIGS. 15A and 15B are diagrams useful in describing connection management tables;

FIG. 17 is a diagram useful in describing the generation of a VC-connection OAM cell for giving notification of fault occurrence;

FIG. 18 is a diagram useful in describing PM processing in a case where an NVP connection has been established;

FIG. 19 is a diagram useful in describing the basic mechanism of OAM flow;

FIGS. 20A and 20B are diagrams showing the constitution of OAM cells;

FIG. 21 shows a correspondence table (for both F4 and F5) of OAM cell type/function type;

DESCRIPTION OF THE PREFERRED EMBODIMENTS (A) First embodiment (a) Overall configuration FIG. 1 is a diagram showing the construction of a plural-line interface according to a first embodiment of the present invention. Here a single package accommodates plural sets of incoming/outgoing lines. Shown in FIG. 1 are a physical layer terminating unit 30 having a physical layer terminator 31 on the input side to which a plurality of incoming lines (IN lines #0~#n) are connected and a physical layer terminator 32 on the output side to which a plurality of outgoing lines (OUT lines #0~#n) are connected. An ATM layer terminating unit 33 is provided between the physical layer terminating unit 30 and a multiplexer/demultiplexer, which is not shown. The ATM layer terminating unit 33 includes a header converter 34 for converting a line-identifier/VPI/VCI, which has been added onto a cell, to an identifier ICID for internal processing purposes, a UPC processor 35, a billing/NDC processor 36, an OAM processor 37 and a header back-converter 38 for converting the internal-processing identifier ICID back to the line-identifier/VPI/VCI.

(b) Physical terminators

Figure 2:
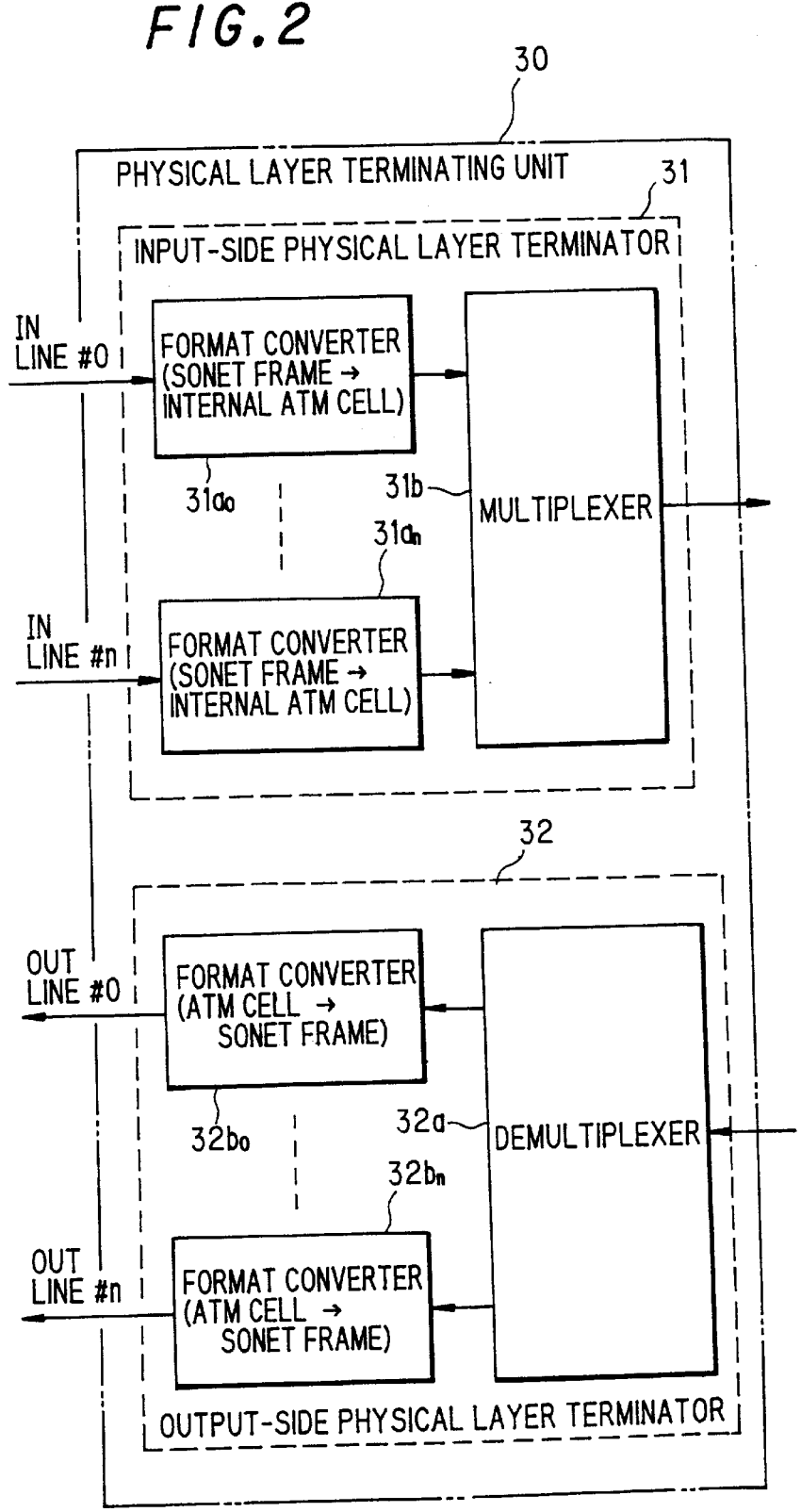
FIG. 2 is a block diagram showing the construction of a physical terminating unit.

The physical terminators 31, 32 on the input and output sides have the constructions shown in FIG. 2. By way of example, (1) one line is connected if the line has an OC12C (624 Mbps) format, (2) a maximum of four lines are connected if the lines have an OC3C (156 Mbps) format, and (3) a maximum of 12 lines are connected if the lines have a DS3 format.

The physical layer terminator 31 on the input side has format converters $31a_0$~$31a_n$ for converting the format of signals that enter from the lines #0~#n to the ATM cell format (FIG. 3) prevailing within the switch, and for outputting the resulting cells. The format converters $31a_0$~$31a_n$ further output a frame pulse and an enable signal CEB, which indicates whether the cell is valid or invalid, together with the cell CL. The physical terminator 31 further includes a multiplexer 31b for time-division multiplexing and outputting ATM cells that enter from each of the format converters $31a_0$~$31a_n$.

Figure 24:
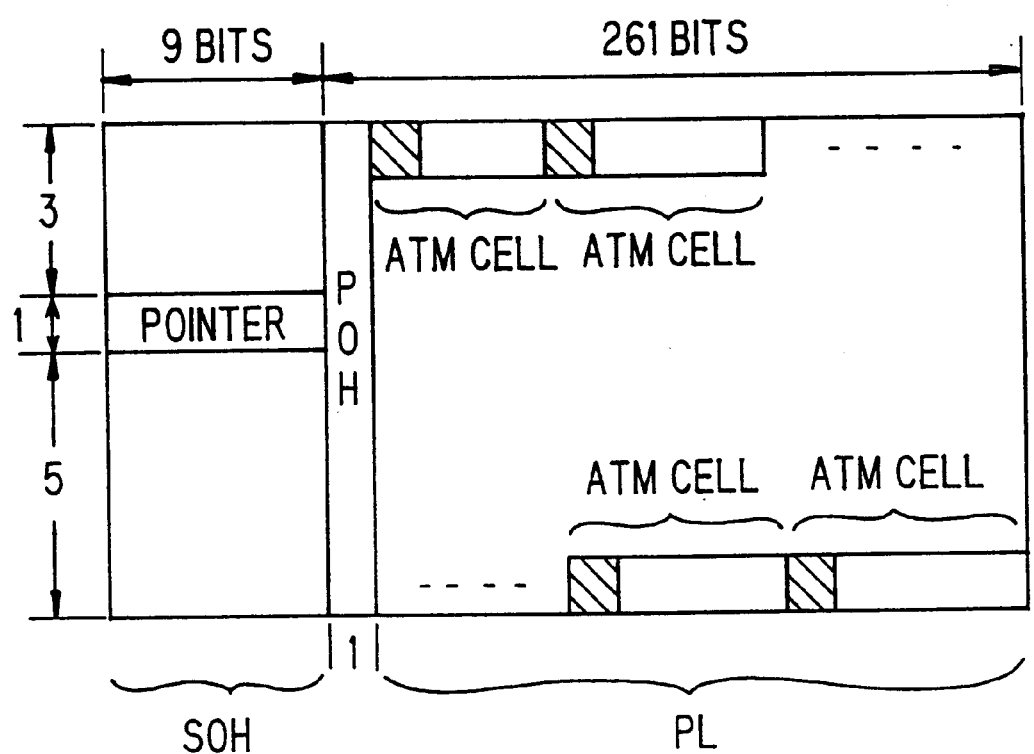
FIG. 24 is a diagram for describing a SONET STS-3C frame format.

When frame signals having e.g. the OC3C (156 Mbps) format (see FIG. 24) enter, the format converters $31a_0$~$31a_n$ remove overhead (section overhead SOH and path overhead POH) from the signals, extract the ATM cells from the payloads PL, make the conversion to the cell format prevailing within the switch and then output the resulting cells.

Figure 3:
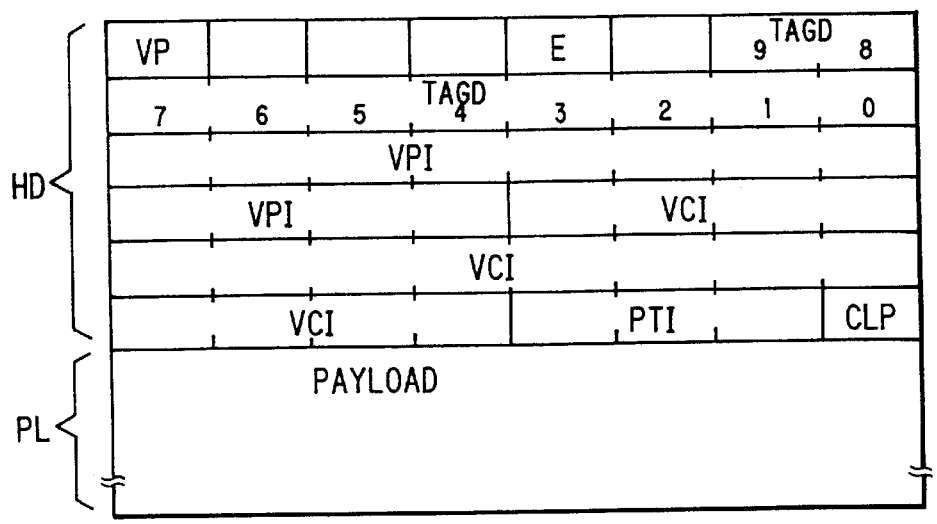
FIG. 3 is a diagram useful in describing an internal ATM cell format according to the present invention.

FIG. 3 is a diagram useful in describing an ATM cell output by the format converters $31a_0$~$31a_n$. Here HD represents a 6-octet header and PL a 48-octet payload. The header HD includes a VP-connection/VC-connection identifier VP, a forced empty-cell identifier E, a line identification tag TAGD (0~9), a virtual-path-identifier/virtual-channel-identifier VPI/VCI, payload type identifier PTI and cell loss priority CLP.

Figure 4:
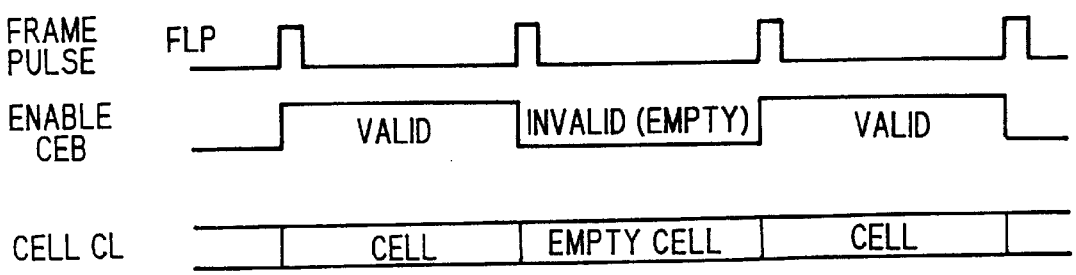
FIG. 4 is a diagram useful in describing timing.

The VP-connection/VC-connection identifier VP specifies whether a cell is a VP-connection cell or a VC-connection cell. If the VPI that has been added onto a cell agrees with a predetermined value, VP is made "1" to indicate a VP-connection cell; otherwise, VP is made "0" to indicate a VC-connection cell. The forced empty-cell identifier E indicates whether an empty cell is the result of deleting overhead of a signal that has entered from a line. As shown in FIG. 4, an empty cell is inserted in an interval in which valid cells are absent. If the empty cell is one that has been obtained by deleting the overhead of the transmission line signal, then E="1" will hold. On the other hand, if the empty cell is one that exists because the payload of a signal did not have a valid cell from the start, then E="0" will hold. The tag TAGD (0~9) is a line identifier for identifying the line on which the cell arrived. The 12 lines of the DS3 format are represented by four bits and the four lines of the OC3C (156 Mbps) format are represented by two bits.

The physical layer terminator 32 on the output side has a demultiplexer 32a for demultiplexing a cell stream, which has entered from the switch side, onto each of the lines based upon the tags (line identifiers) that have been added onto the cells, and format converters $32b_0$~$32b_n$ for converting the ATM cells, which have the format shown in FIG. 3, to transmission line signals and sending the signals to the lines.

(c) Header converter

The header converter 34 converts a combined identifier, which is a combination of the line identifier and VPI/VCI value that have been added onto a cell, to an internal-processing identifier, to the internal-processing identifier ICID having a small number of bits. The sizes of the various management tables can be reduced by making the conversion to ICID having the small number of bits.

FIG. 5 is a diagram useful in describing the method of making the conversion to ICID. Shown in FIG. 5 are a first table 34a for storing a base address BA necessary to obtain the ICID of a VP connection and the ICID of a VC connection, a second table 34b for storing the ICID of a VC connection, and address generators 34c, 34d.

Reference is had to the VP-connection/VC-connection identifier VP to determine whether a cell is a VP-connection cell. If the cell is the VP-connection cell, the address generator 34c refers to the line identifier to determine the line on which the cell arrived and generates an address A in accordance with (1)~(3) below. Specifically, the address generator 34c (1) generates a 20-bit address A, which comprises VPI (12 bits) +00000000 (8 bits), if the line on which the cell arrived is a line having the OC12C format;

(2) generates a 20-bit address A, which comprises line identifier (2 bits)+VPI (12 bits)+000000 (6 bits), if the line on which the cell arrived is a line having the OC3C format; and (3) generates a 20-bit address A, which comprises line identifier (4 bits)+VPI (12 bits)+0000 (4 bits), if the line on which the cell arrived is a line having the DS3 format.

The 12- bit internal-processing identifier ICID of the VP connection is subsequently obtained from the storage area of the first table 34a designated by the address A.

If the cell is the VC-connection cell, on the other hand, the address generator 34d refers to the line identifier to determine the line on which the cell arrived and generates an address A in accordance with (1)~(3) below. Specifically, the address generator 34d (1) generates a 20-bit address A, which comprises VPI (12 bits)+VCI (8 higher order bits), if the line on which the cell arrived is a line having the OC12C format;

(2) generates a 20-bit address A, which comprises line identifier (2 bits)+VPI (12 bits)+VCI (6 higher order bits), if the line on which the cell arrived is a line having the OC3C format; and (3) generates a 20-bit address A, which comprises line identifier (4 bits)+VPI (12 bits)+VCI (4 higher order bits), if the line on which the cell arrived is a line having the DS3 format.

Next, the 12-bit base address BA is obtained from the storage area of the first table 34a designated by the address A. Thereafter, a 20-bit address B is generated by combining the 12-bit base address BA and 8 lower order bits of the VCI. If stored data is read out of the storage area of the second table 34b designated by the address B, the 12-bit internal-processing identifier ICID of the VC connection is obtained.

Figure 6:
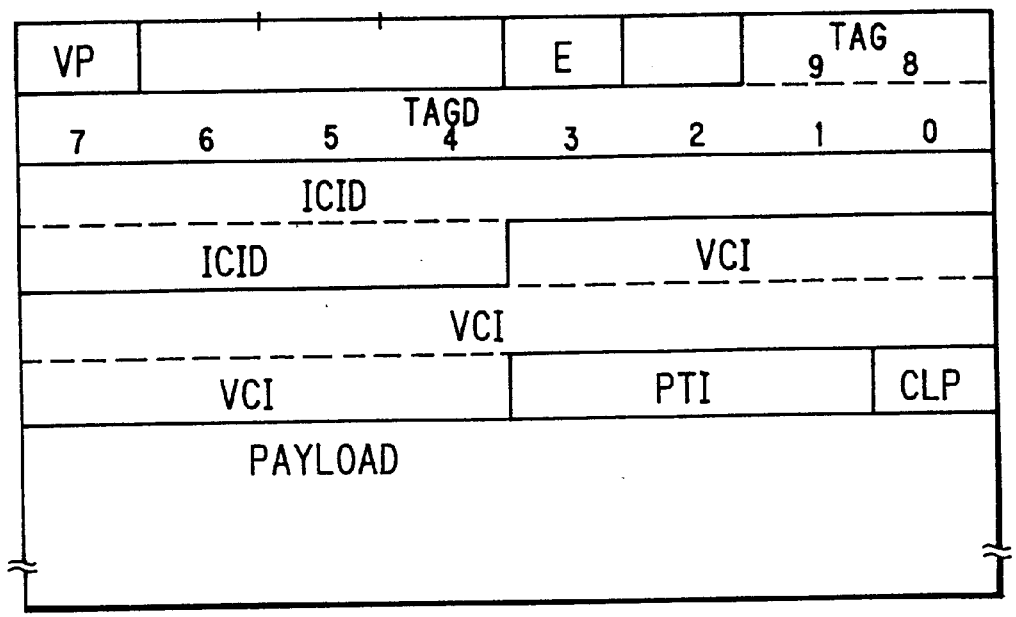
FIG. 6 shows ATM cell format after the conversion to the ICID.

As a result of the foregoing operation, the line-identifier/VPI/VCI (a total of 38 bits) is converted to the 12-bit internal-processing identifier ICID, which is added on at the VPI position, as shown in FIG. 6. Thereafter, data necessary for OAM processing of each line is managed unitarily in the connection management table using the internal-processing identifier ICID.

(d) OAM processor (d-1) Overall configuration

Figure 7:
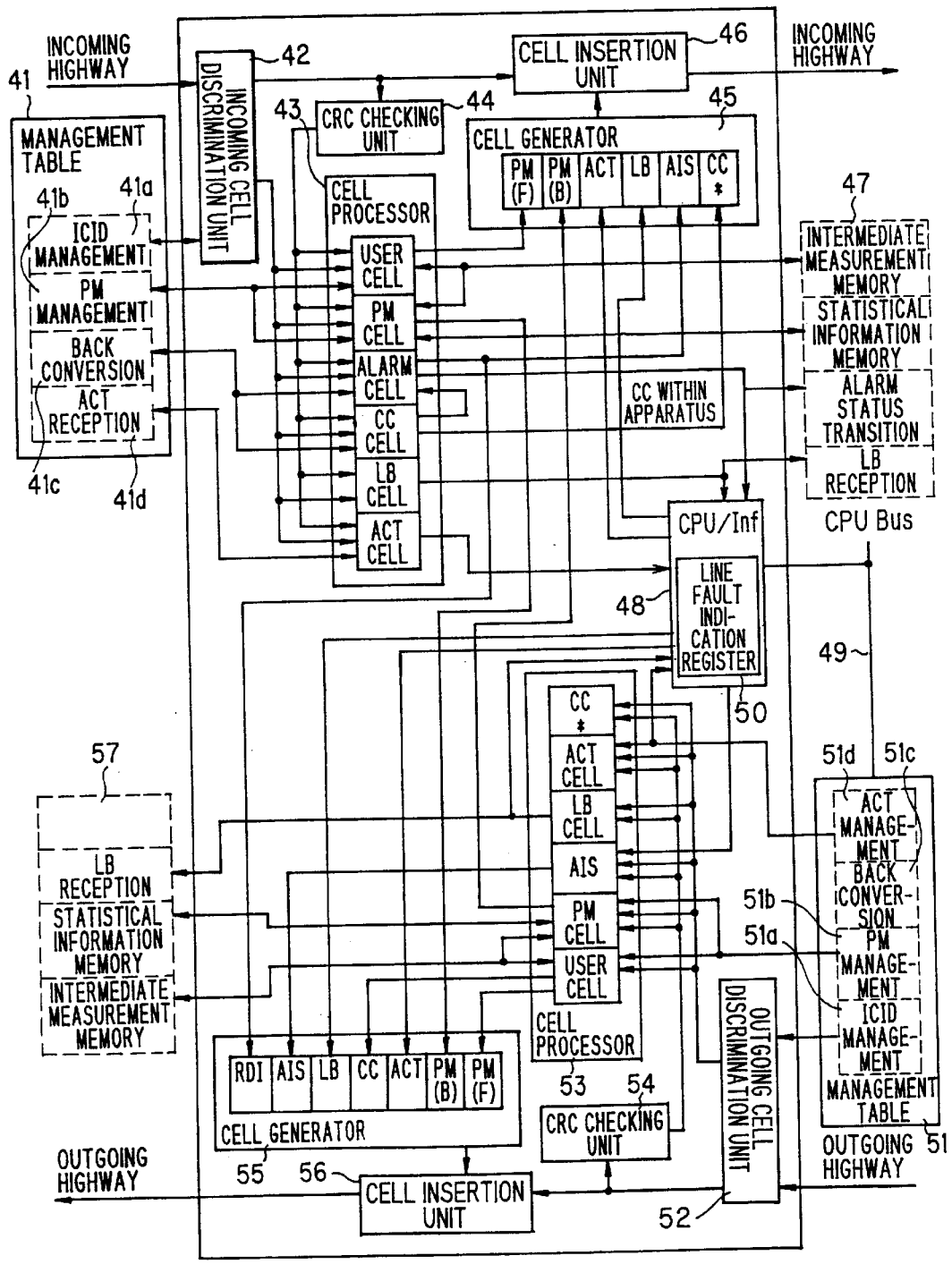
FIG. 7 is block diagram showing the overall configuration of an OAM processor.

FIG. 7 is block diagram showing the overall configuration of the OAM processor 37. Shown in FIG. 7 are an incoming management table 41 and an outgoing management table 51. The management tables 41, 51 respectively include (1) connection management tables 41a, 51a addressed by ICID, (2) PM management tables 41b, 51b addressed by a PM-ID (Performance Management Identifier), (3) back-conversion tables 41c, 51c and (4) Act reception tables 41d, 51d. Numerals 42, 52 denote incoming/outgoing cell discrimination units. Cell processors 43, 53 execute processing conforming to identified incoming/outgoing OAM and user cells. Numerals 44, 54 denote cell CRC checking units. Cell generators 45, 55 generate various incoming/outgoing OAM cells, cell insertion units 46, 56 insert generated OAM cells into incoming/outgoing highways. Memories 47, 57 store intermediate measured values and statistical information involved in PM processing, alarm-status transition data involved in alarm processing, and LB reception signals. A CPU interface 48 is connected to a CPU bus 49 and exchanges data with a CPU (not shown) via the bus 49. The CPU interface 48 is provided with a line fault indication register 50 in which fault occurrence data on a per-line basis is set.

(d-2) Construction of OAM cell reception processing/extracting unit

Figure 8:
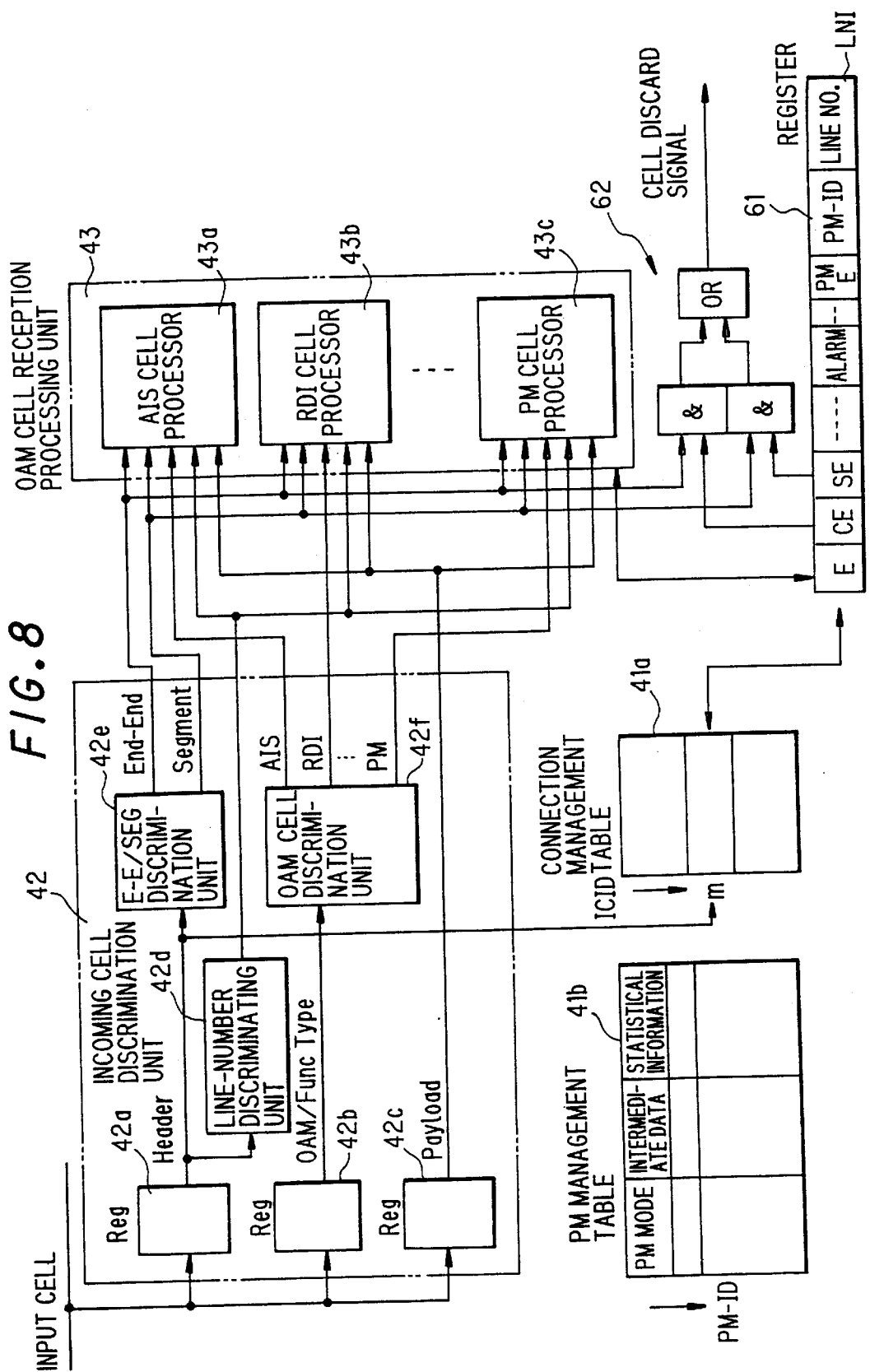
FIG. 8 is a block diagram showing the construction of an OAM cell reception processing/extracting unit.

FIG. 8 is a block diagram showing the construction of an OAM cell reception processing/extracting unit. Shown in FIG. 8 are the connection management table 41a addressed by ICID, the PM management table 41b addressed by PM-ID, the incoming cell discrimination unit 42 for discriminating incoming OAM cells, the OAM cell reception processor 43 for executing processing conforming to OAM and user cells, a register 61 for holding information (OAM management data) that has been read out of the connection management table 41a, and a cell discarding unit 62. If the OAM processor has been designated as being an end point by the management data, the cell discarding unit 62 discards the end-to-end OAM cell. If the OAM processor has been designated as being a segment end point by the management data, the cell discarding unit 62 discards the segment OAM cell.

The management data area of the connection management table 41a has (1) a connection enable bit E indicating whether a connection is valid or invalid;

(2) a bit CE indicating whether a point is an end point;

(3) a bit SE indicating whether a point is a segment end point;

(4) a fault-status indication bit AIS;

(5) a PM enable bit PME indicating whether a PM (performance management function) is valid or not;

(6) a PM-ID (performance management identifier) indication bit; and (7) a line-number indication bit LNI corresponding to ICID.

These bits store the data necessary for OAM processing. Enable data and line number are set in the connection enable bit E and line-number indication bit LNI, respectively, by a command from a call processor when a call is established. The enable data and line number are reset in response to completion of the call. The fault indication bit is set by detection of fault occurrence or by notification of fault occurrence. Other information is set/reset by maintenance personnel.

(1) PM mode (forward/backward), (2) intermediate data (cell count, result BIP of bit interleave processing, etc.) and (3) statistical data, etc., are stored in the PM management table 41b in correspondence with PM-ID.

The cell discrimination unit 42 includes a register 42a for storing a cell header, a register 42b for storing OAM cell type/function type, a register 42c for storing a function-specific field, a line-number discrimination unit 42d for discriminating, from the header, the line on which a cell has arrived, an E-E/seg discrimination unit 42e for discriminating, from the cell header, whether an OAM cell is a segment OAM cell or a end-to-end OAM cell, and an OAM cell discrimination unit 42f for discriminating the category of OAM cell from the OAM cell type/function type.

The OAM cell reception processing unit 43 includes an AIS cell processor 43a, an RDI cell processing unit 43b and a PM cell processing unit 43c and executes OAM processing conforming to AIS cells, RDI cells, PM cells, . . . on a per-line basis. For example, if a cell having any ICID arrives, connection management data conforming to the ICID is read out of the connection management table 41a and stored in the register 61. If the cell is a Fault Management cell for giving notification of an AIS, the AIS cell processor 43a is activated to set the fault-occurrence indication bit of the connection management data to "1" and shift the status of the connection to the AIS alarm state. On the other hand, if the cell is a PM cell or user cell undergoing monitoring, the PM cell processor 43c is activated to execute PM processing for line support using the PME, PM-ID of the connection management data and the PM management table 41b.

Thus, even in an instance where the OAM processor executes processing for a plurality of lines, the processor converts the line-number/VPI/VCI to an ICID having a small number of bits and unitarily manages the data, which is required for the OAM processing of each line, by means of the connection management table 41a addressed by ICID. As a result, the required memory capacity can be reduced and OAM processing that is aware of the lines can be executed.

(d-3) OAM cell generator

Figure 9:
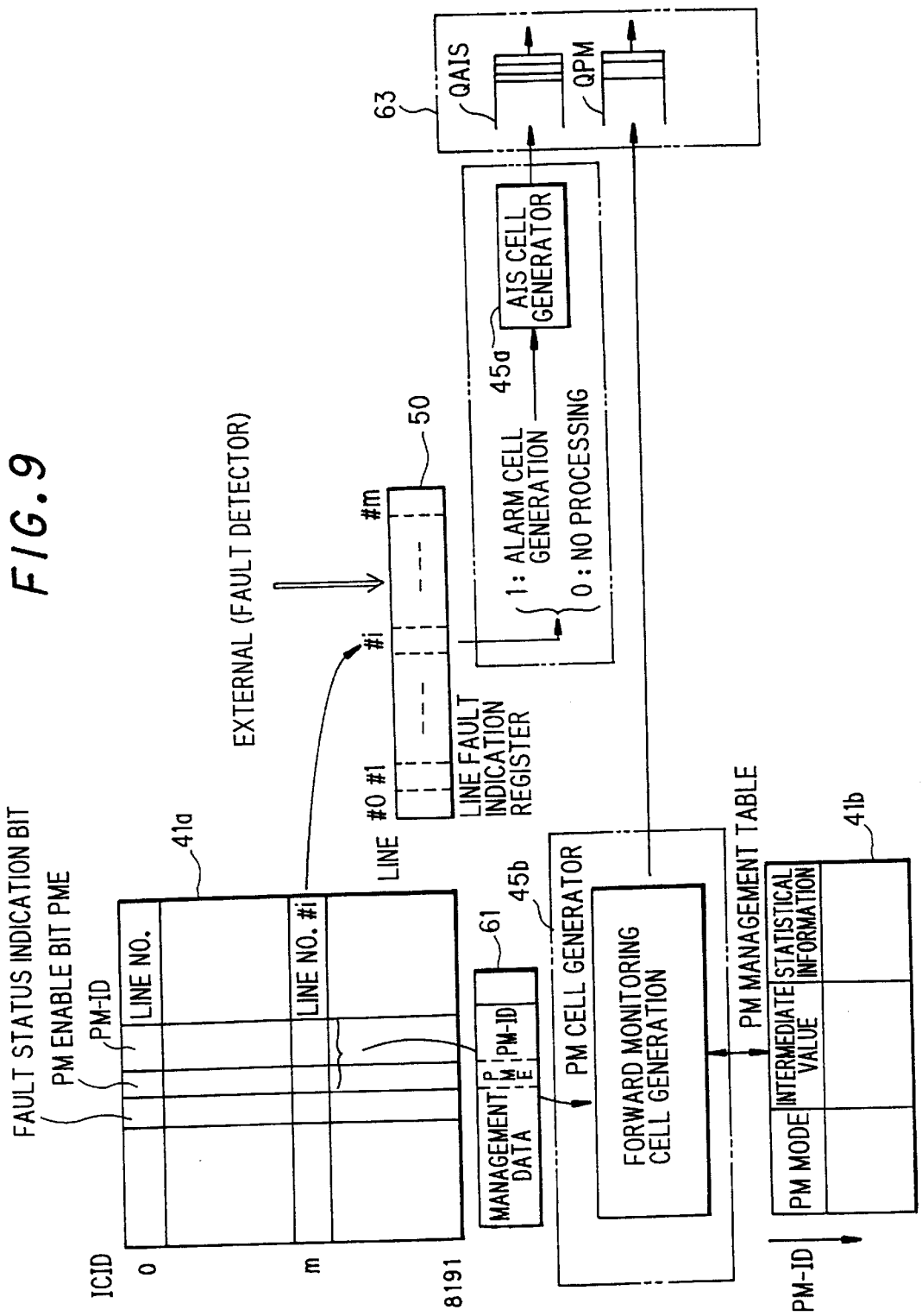
FIG. 9 is a diagram useful in describing an OAM cell generator.

FIG. 9 is a diagram useful in describing the OAM cell generator. The illustrates relates solely to an AIS cell generator 45a and a PM cell generator 45b. Shown in FIG. 9 are the connection management table 41a, the PM management table 41b, the AIS cell generator 45a, the PM cell generator 45b, the line fault indication register 50, the register 61 for storing management data, and a queuing buffer 63 for queuing generated OAM cells. The latter has a queuing buffer QAIS for queuing AIS cells and a QPM queuing buffer for queuing PM cells. Though only two queuing buffers are shown, in actually a queuing buffer for AIS cells, a queuing buffer for RDI cells, a queuing buffer for PM cells, . . . are provided on a per-line basis.

AIS cell generation

The line fault indication register 50 has m bits, wherein an ith (i=0~m) bit corresponds to an ith line. If a fault develops in an ith line, a fault detector (not shown) write "1" to the ith bit. In response to fault recovery, the fault detector writes "0" to the ith bit.

The AIS cell generator 45$a$ reads out management data by successively incrementing the address of the connection management table 41$a$ and, by referring to the line fault indication register 50, determines whether a fault has occurred in the line indicated by the line number #i of the management data. If the content of the ith bit corresponding to the line #i is "0", this means that a fault has not occurred in the line #i and, hence, an AIS cell is not generated.

If "1" has been written to the ith bit, however, this means that a fault has occurred in the line #i. In this case the AIS cell generator 45$a$ generates an AIS notification OAM cell having the address m of the management table 41$a$, from which the line number #i has been read out, as the internal-processing identifier ICID and the line number #i as the tag TAGD, and writes this OAM cell to the queuing buffer QAIS corresponding to the AIS cell of line #i.

The AIS cell generator 45$b$ subsequently scans the connection management table 41$a$ cyclically and repeats the above-described processing. If a line develops a fault, the AIS cell generator 45$b$ generates the OAM cell which gives notification of the AIS and queues this call in the prescribed queuing buffer. The queued AIS cell is transmitted upon being read out of the queuing buffer.

PM cell generation

When management data is read out of the connection management table 41$a$ from the location designated by the ICID (=m) address of the user cell and this data is stored in the register 61, the PM cell generator 45$b$ determines whether the PME bit of the management data is "1", i.e., whether the cell is a user cell undergoing monitoring.

If the cell is a user cell undergoing monitoring, the PM cell generator 45$b$ refers to the stored content of the PM management table designated by the PM-ID and determines whether the PM mode is forward monitoring or backward reporting. If the PM mode is forward monitoring, the PM cell generator 45$b$ computes intermediate data (number of monitored cells, BIP, etc.) and updates the content of the PM management table. The PM cell generator 45$b$ further performs monitoring, on a per-connection basis, to determine whether a fixed number of user cells undergoing monitoring have passed. If a fixed number of these user cells have passed, the PM cell generator 45$b$ generates a forward monitoring cell having the ICID of the monitored user cell as the ICID and the line identifier, which is included in the header of the monitored user cell, as the tag TAGD, and queues the forward monitoring cell in the queuing buffer QPM of this line. Thereafter, the queued forward monitoring cell is transmitted upon being read out of the queuing buffer. In a case where the PM mode is backward reporting, the corresponding processing is executed.

Thus, OAM cells can be generated to accommodate each line.

(d-4) OAM cell insertion unit

When OAM cells are read out of a queuing buffer and inserted into an ATM cell stream, it is required to perform control in such a manner that the band of each line will not be exceeded by insertion of the OAM cells. An OAM cell is inserted at the position of an empty cell (see FIG. 4). One type of empty cell is that obtained eliminating the overhead portion of the signal. If an OAM cell is inserted at the position of such an empty cell unconditionally, the band will be exceeded. Accordingly, in order to arrange it so that the band will not be exceeded, an OAM cell should not be inserted at the position of an empty cell obtained by eliminating the overhead portion but at the position of an empty cell other than the empty cell of the above-mentioned type (namely at the position of the empty cell of the payload portion). For this reason, the forced empty-cell identifier E, which indicates that an empty cell is one that was obtained by eliminating the overhead portion, has been added onto the cell header (see FIG. 3). Insertion of OAM cells is controlled by referring to this forced empty-cell identifier E.

Figure 10:
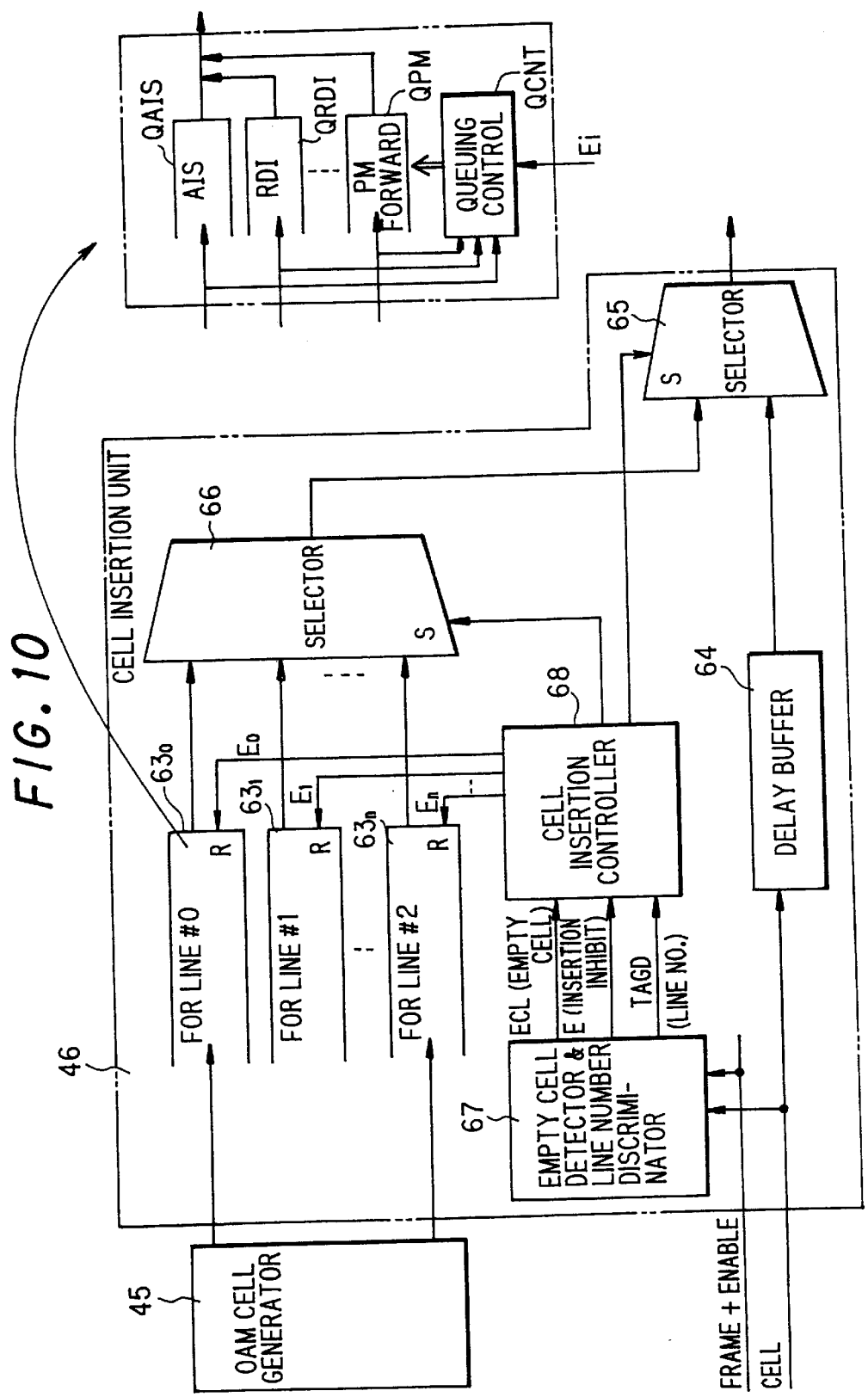
FIG. 10 is a block diagram showing the construction of an OAM cell insertion unit.

FIG. 10 is a block diagram showing the construction of the OAM cell insertion unit. Shown in FIG. 10 are the OAM cell generator 45 and the cell insertion unit 46. The latter includes queuing buffers $63_0$, $63_1$, . . . $63_n$ for queuing OAM cells of line numbers #1~#n. Each queuing buffer has, on a per-line basis, a queuing buffer QAIS for queuing AIS cells, a queuing buffer QRDI for queuing RDI cells, a queuing buffer QPM for queuing PM cells, . . . , and a queuing controller QCNT for controlling the writing/reading of cells to/from each of the queuing buffers. The queuing controller QCNT stores the order in which cells were written to each of the queuing buffers QAIS, QRDI, QPM, . . . . When cell transmission is specified, the queuing controller QCNT reads the oldest written cell out the prescribed queuing buffer and then outputs the cell.

The cell insertion unit 46 further includes a delay buffer 64 for timing adjustment, selectors 65, 66, a empty cell detector and line number discriminator 67 and a cell insertion controller 68. The empty cell detector and line number discriminator 67 extracts and outputs the forced empty-cell identifier E and the line identifier TAGD contained in the cell header, detects an empty cell from an arriving frame/enable signal that travels together with the cell, and outputs an empty-cell position signal ECL. When the empty-cell position signal ECL is "1" and the forced empty-cell identifier E is "0" (cell insertion allowed), the cell insertion controller 68 instructs the selectors 65, 66 to select a prescribed cell and sends a cell output enable signal Ei to the queuing buffer indicted by the line number TAGD. Upon receiving the cell output enable signal Ei, the queuing buffer 63$i$ sends an OAM cell to the selector 66. The selector 66 selects this OAM cell and sends it to the selector 65. The latter selects this OAM cell and outputs the cell. As a result of the above operation, the OAM cell of a line is inserted at the position of the empty cell of the line in the payload section.

If the empty-cell position signal ECL is "1" and the forced empty-cell identifier E is "1" (cell insertion inhibited), the cell insertion controller 68 will not output the cell selection command to the selector 66 and will instruction the selector 65 to select the output of the delay buffer 64. As a result, the cell stream output by the delay buffer 64 is delivered intact by the selector 65. Also, in a case where the empty-cell position signal ECL is "0", the cell stream output by the delay buffer 64 is delivered intact by the selector 65.

As a result of the operation described above, the band will not be exceeded at each line even if an OAM cell is inserted. This makes it possible to prevent the occurrence of user cell loss due to exceeding of the band.

(B) Second embodiment (a) Overview of the second embodiment

Figure 11A:
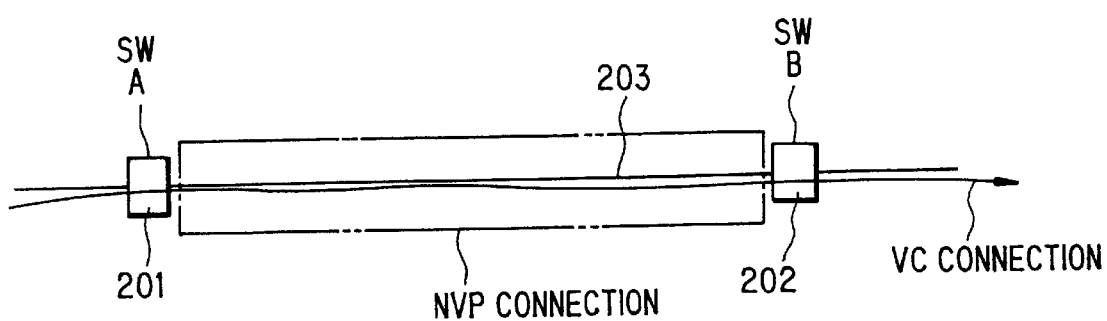
FIGS. 11A and 11B are diagrams for describing an overview of a second embodiment of the present invention.

In order to manage a prescribed line 203 between adjacent ATM switches 201, 202, there are cases where a network VP connection (NVP connection) is established for the line and OAM cells for the NVP connection are sent and received between the ATM switches 201, 202 to implement management of the line 203, as illustrated in FIG. 11A. When such an NVP connection is established, it is required that the OAM processors within the ATM switches 201, 202 execute OAM processing for the NVP connection and for a VC connection, respectively, which is accommodated by the NVP connection.

The NVP connection is terminated by the line interfaces of the ATM switches. Consequently, it is not required that the identifier ICID for internal processing be allocated to the NVP connection as in the manner of the VC connection; allocating the identifier ICID would reduce the number of VC connections capable of being accommodated. For this reason, the usual practice is to discriminate an NVP connection solely by the VPI without allocating the internal-processing identifier ICID to the NVP connection. However, with a line interface that accommodates a plurality of lines, a line identifier is necessary in addition to the VPI to identify an NVP connection. Accordingly, the line identifier and VPI are converted to a degenerate VPI having a small number of bits, the NVP connection is identified by the degenerate VPI and processing of NVP-connection OAM cells is executed. With regard to other VC connections, these are identified by the internal-processing ICID and OAM processing is executed. As a result, the sizes of the NVP-connection management table and VC connection management table necessary for the OAM processing of the respective connections are reduced.

Figure 11B:
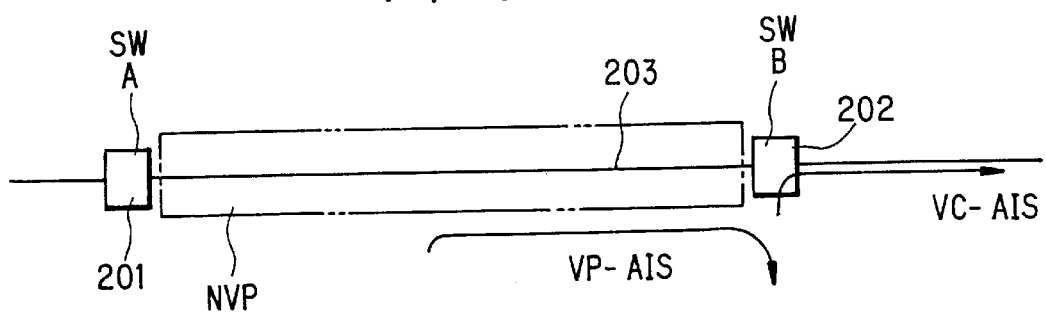

As shown in FIG. 11B, an OAM cell (VP-AIS) for an NVP connection is terminated by the OAM cell processor of the initial ATM switch 202 and is not sent downstream. Therefore, in a case where the OAM cell (VP-AIS) for the NVP connection notifies of a NVP fault, the NVP fault will not be communicated to ATM switches located downstream. Accordingly, it is so arranged that a NVP fault of which notification has been given by an OAM cell for an NVP connection can be communicated downstream of the NVP connection by an OAM cell (VC-AIS) of a VC connection.

When an NVP connection has been set, there are cases where performance management of a VC connection and performance management of an NVP connection which accommodates this VC connection must be carried out at the same time. Even in this case it is required to so arrange it that PM processing can be executed with regard to each of these types of performance management at the same time.

(b) Overall configuration

Figure 1:
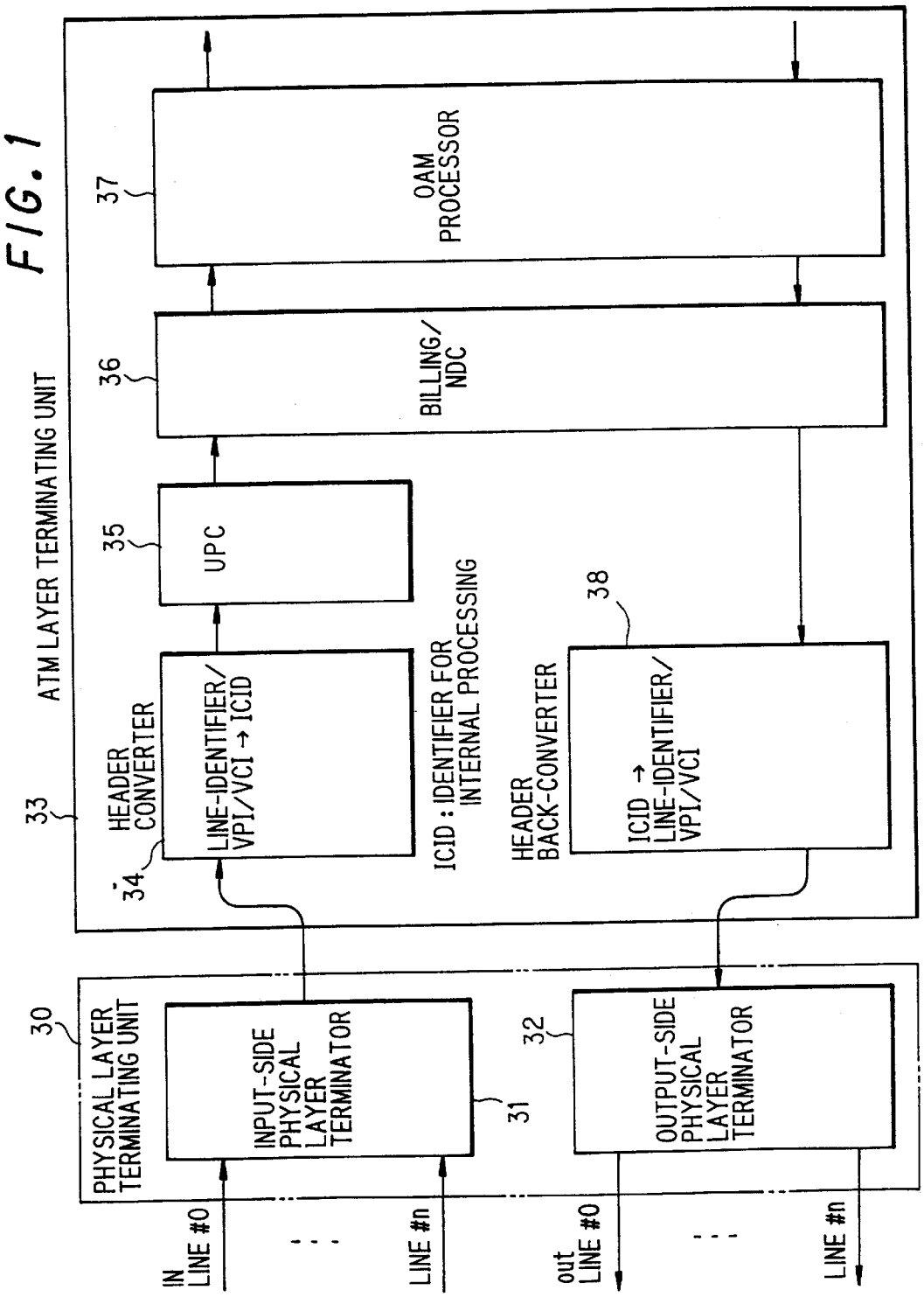
FIG. 1 is a block diagram showing the construction of a line interface according to a first embodiment of the present invention.

FIG. 12 is a block diagram showing the construction of a plural-line interface according to a second embodiment of the present invention. Here a single package accommodates plural sets of incoming/outgoing lines. Elements in FIG. 12 identical with those of the first embodiment of FIG. 1 are designated by like reference characters.

Shown in FIG. 12 are the physical layer terminating unit 30 having the physical layer terminator 31 on the input side to which a plurality of incoming lines (IN lines #0~#n) are connected and the physical layer terminator 32 on the output side to which a plurality of outgoing lines (OUT lines #0~#n) are connected. The ATM layer terminating unit 33 is provided between the physical layer terminating unit 30 and a multiplexer/demultiplexer, which is not shown. A header converter 34' (1) converts the line-identifier/VPI that has been added onto the OAM cell for an NVP connection to a degenerate VPI and (2) converts the line-identifier/VPI/VCIs that have been added onto other cells to the identifier ICID for internal processing. The ATM terminating unit 33 further includes the UPC processor 35, the billing/NDC processor 36, the OAM processor 37 and the header back-converter 38 for converting the internal-processing identifier ICID back to the line-identifier/VPI/VCI. The OAM processor 37 includes the management table 41a for ordinary VC/VP connections and an NVP-connection management table 141a.

(c) Physical layer terminator and header converter

Figure 13:
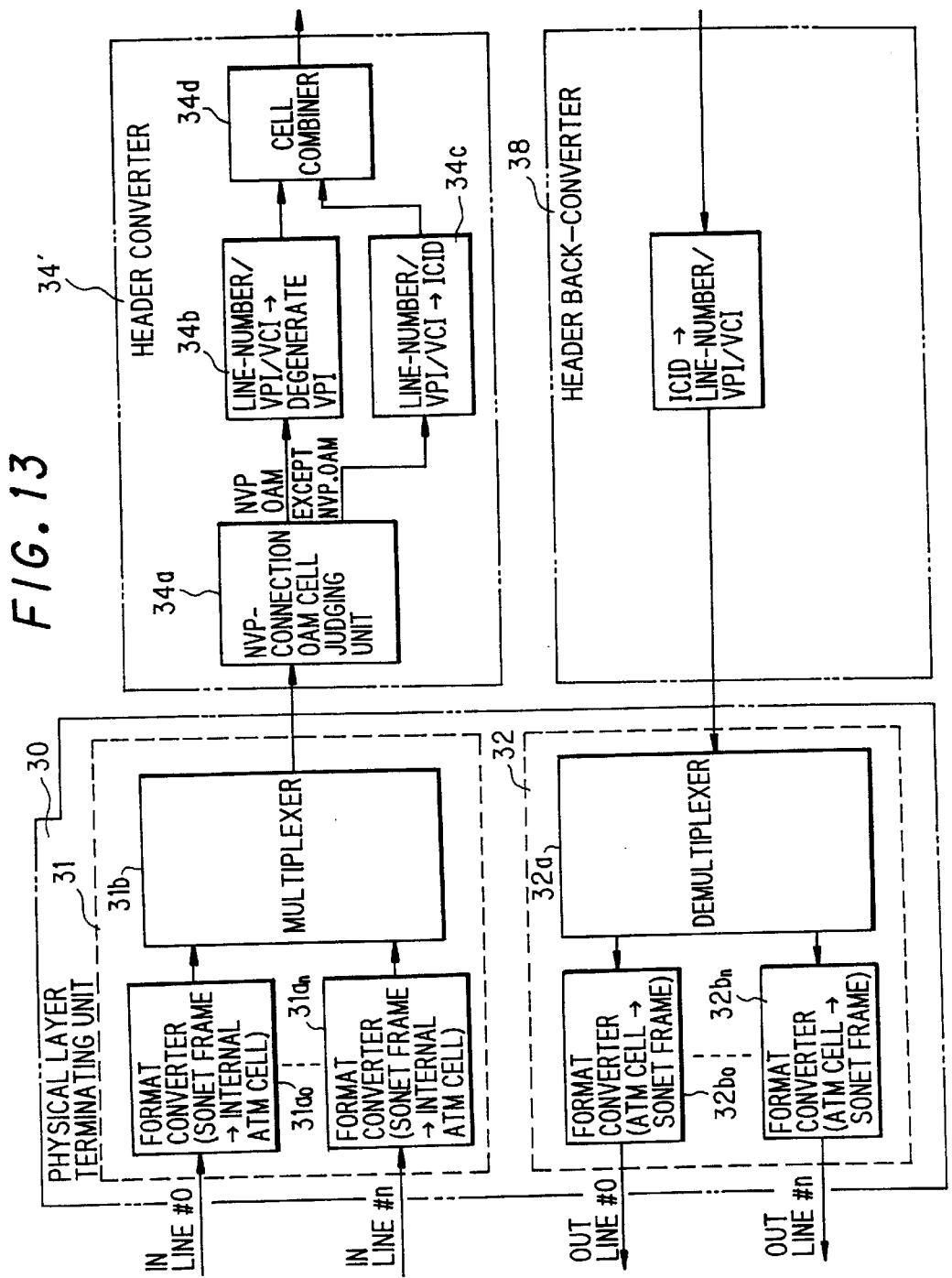
FIG. 13 is a block diagram showing the construction of a physical layer terminator and a header converter.
Figure 14A:
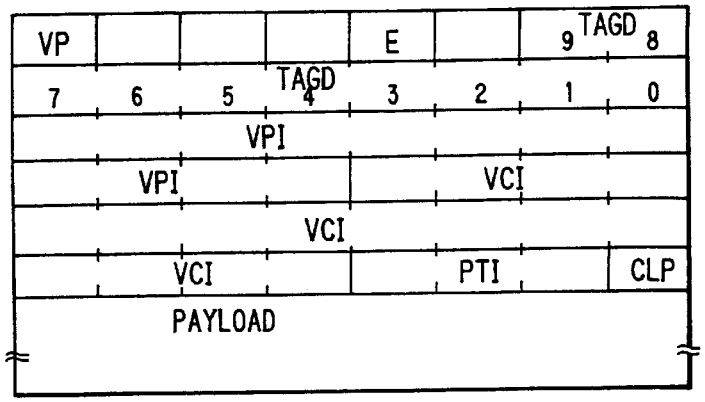
FIGS. 14A, 14B and 14C are diagrams useful in describing ATM cell formats.

As shown in FIG. 13, the physical terminators 31, 32 on the input and output sides have the same construction as those of the first embodiment (see FIG. 2). Accordingly, the format converters of the physical terminator 31 output ATM cells identical with those of the first embodiment, as illustrated in FIG. 14A.

The header converter 34' has a cell judging unit 34a, first and second converters 34b, 34c and a cell combiner 34d. The ATM cell stream enters the cell judging unit 34a, which proceeds to determine whether an ATM cell is an OAM cell for an NVP connection. When the VPI value of an input cell agrees with a preset value and the VCI value is 3 or 4, the cell judging unit 34a judges that the cell is an OAM cell for an NVP connection.

Figure 14B:
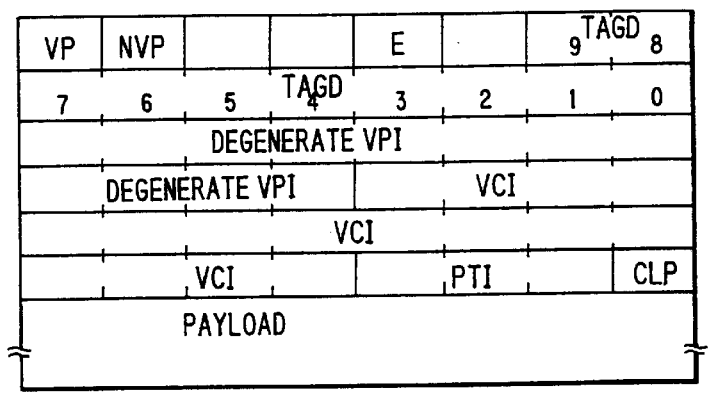

In the case of an OAM cell for an NVP connection, the first converter 34b converts the line-identifier/VPI that has been added onto the cell to a degenerate VPI and then transmits the cell shown in FIG. 14B. The header includes an identifier NVP, which indicates that the cell is an OAM cell for an NVP connection. NVP="1" indicates that the cell is the OAM cell for an NVP connection. With regard to the degenerate VPI, the correspondence between the degenerate VPI and line-identifier/VPI is stored in memory beforehand. A degenerate VPI corresponding to the line-identifier/VPI of an input cell can be obtained by reading it out of the memory.

Figure 14C:
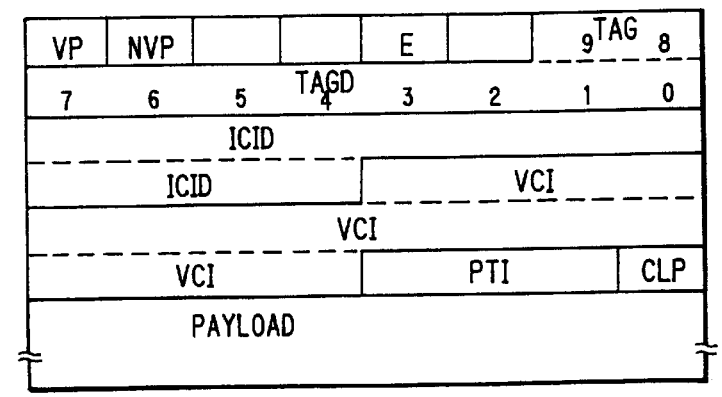

The second converter 34c converts a line-identifier/VPI/VCI that has been added onto a cell other than the OAM cell for an NVP connection to the internal-processing identifier ICID through the method shown in FIG. 5 and outputs the cell shown in FIG. 14C. The cell combiner 34d combines and outputs the cells output by each of the converters 34b, 34c.

(d) Management table in OAM processor

OAM cells include an OAM cell for an NVP connection and an OAM cell for connections other than NVP connections, namely for VC/VP connections. The OAM processor 37 (FIG. 12) executes processing conforming to each of these OAM cells.

To accomplish this, the OAM processor 37 is provided with the NVP-connection management table 141a in in addition to the connection management table 41a for the ordinary VC/VP connections.

FIGS. 15A and 15B are diagrams useful in describing connection management tables. FIG. 15A shows the connection management table 41a for the ordinary VC/VP connections, and FIG. 15B illustrates the NVP-connection management table 141a.

The management data area of the connection management table 41a has (1) a connection enable bit E indicating whether a connection is valid or invalid;

(2) a bit CE indicating whether a point is an end point;

(3) a bit SE indicating whether a point is a segment end point;

(4) a fault-status indication bit AIS;

(5) a PM enable bit PME indicating whether a PM (performance management function) is valid or not;

(6) a PM-ID indication bit;

(7) a line-number indication bit LNI corresponding to ICID; and (8) a degenerate VPI indication bit.

Enable data (="1") and a degenerate VPI value are set in the connection enable bit E and degenerate VPI indication bit, respectively, when a call is established. The enable data and a degenerate VPI value are reset in response to completion of a call. More specifically, the call processor decides the VPI/VCI values of a call and the line that transmits the cell of the call when the call is established. The call processor therefore obtains the ICID (=n) and degenerate VPI (=m) from the line-number/VPI/VCI and sets the connection enable data (="1") and degenerate VPI value (=m) in the area of the connection management table 41a indicated by the ICID value (=n).

The management data area of the NVP management table 141a has (1) a connection enable bit E indicating whether a connection is valid or invalid;

(2) a fault-status indication bit AIS;

(3) a PM enable bit PME indicating whether a PM (performance management function) is valid or not;

(4) a PM-ID indication bit; and (5) a line-number indication bit.

Prescribed enable information is set when an NVP connection is established. More specifically, when an NVP connection is established, a VPI number and line number, etc., enter. As a result, the degenerate VPI value (=m) is obtained from the line-number/VPI value and the above-mentioned NVP connection information is stored in the area of the NVP-connection management table 141a indicated by the degenerate VPI (=m). When a cell arrives, the OAM processor 37 determines whether it is an OAM cell for the NVP connection by referring to the NVP identifier of the cell header. If the cell is the NVP OAM cell, the OAM processor 37 executes OAM processing using the NVP management table 141a. If this is not the case, the OAM processor 37 executes OAM processing using the management table 41a of the VC connections.

(e) NVP-connection alarm cell generation

Figure 16:
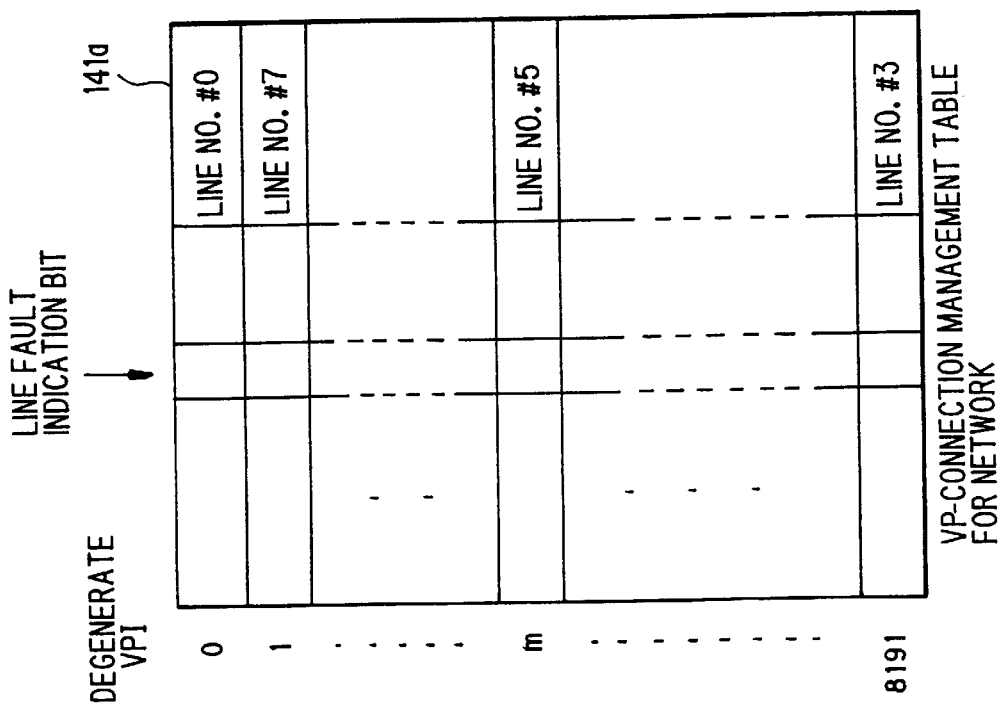
FIG. 16 is a diagram useful in describing the generation of an NVP-connection alarm cell.
Figure 22:
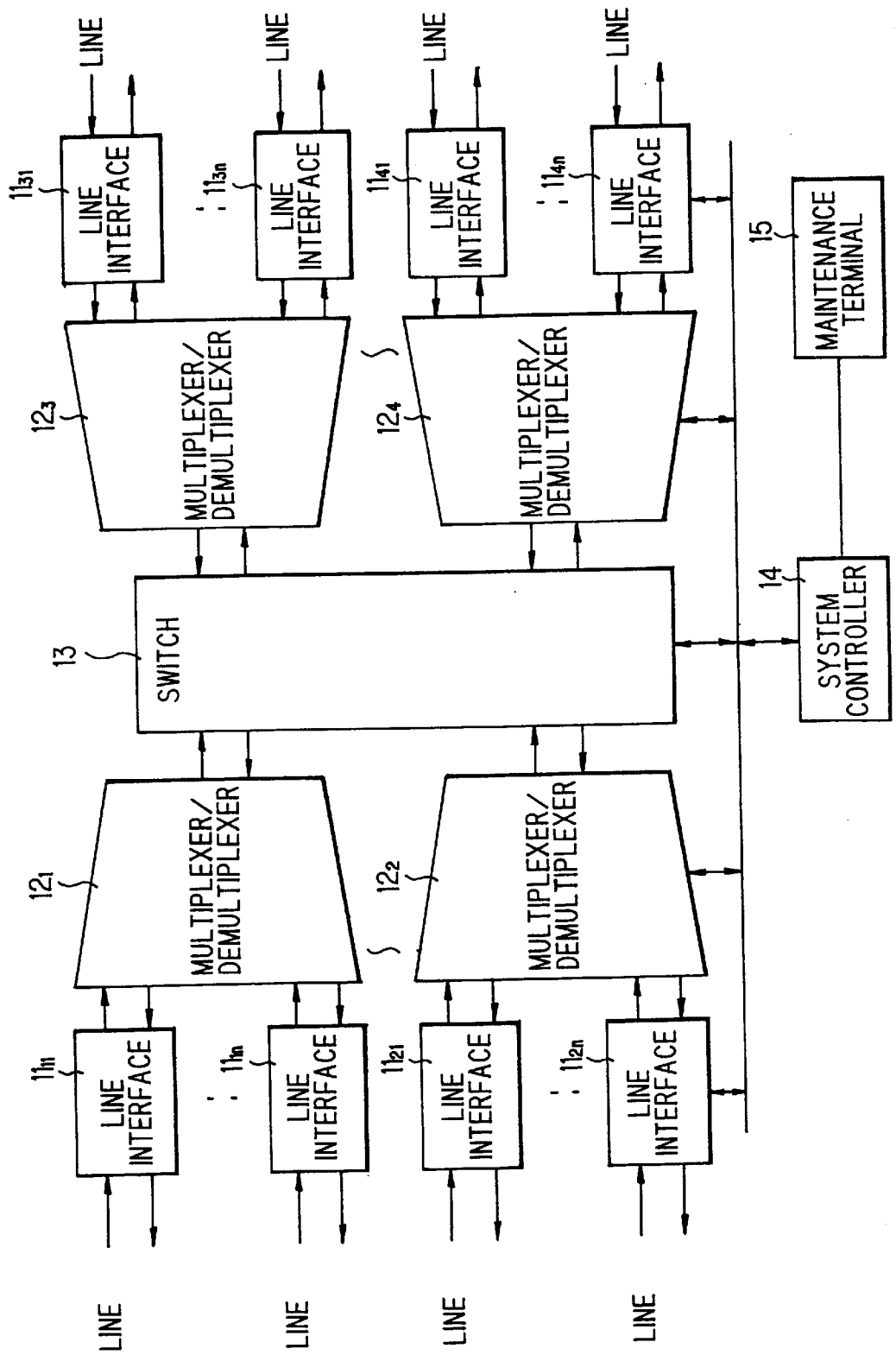
FIG. 22 shows the configuration of an ATM switching system.
Figure 23:
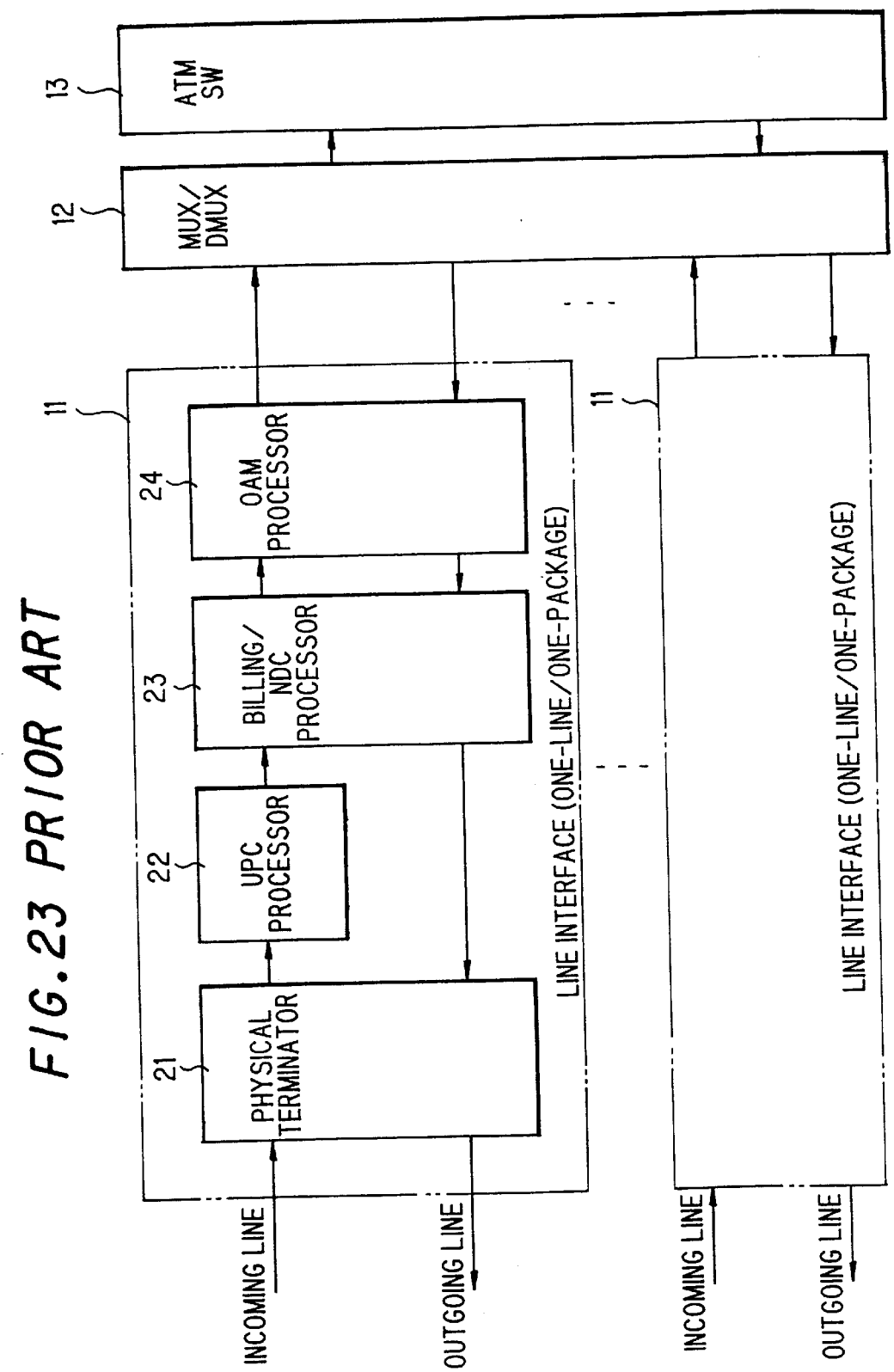
FIG. 23 is a block diagram showing the construction of a line interface.

FIG. 16 is a diagram useful in describing the generation of an NVP-connection alarm cell. The line fault indication register 50 stores an indication of whether a fault has occurred on each line. Shown at 141a is the NVP-connection management table and at 145a an RDI cell generator.

The line fault indication register 50 has m bits, the ith bit of which corresponds to an ith line. When an ith line develops a fault, a fault detector (not shown) writes "1" to the ith bit. The fault detector writes "0" to this bit in response to recovery from the fault.

The RDI cell generator 145a increments the address of the NVP-connection management table 141a successively to read out the NVP-connection management data and, by referring to the line fault indication register 50, determines whether a fault has occurred in the line indicated by the line number #i (#5 in FIG. 16) of this management data. If the content of the ith bit corresponding to the line number #i is "0", this means that the ith line has not developed a fault and, hence, the RDI cell is not generated. However, if "1" has been written to the ith bit, this means that the ith line has developed a fault. In such case the RDI cell generator 145a generates an NVP-connection OAM cell for alarm status notification having the address (=m) of the NVP management table 141a, from which the line number #i has been read out, as the degenerate VPI value and the line number #i as the tag TAGD, and writes this NVP-connection OAM cell to the queuing buffer QRDI corresponding to the RDI cell of ith line. The RDI cell generator 145a subsequently scans the NVP-connection management table 141a cyclically and repeats the above-described processing. The RDI cell that has been written to the queuing buffer QRDI is read out and transmitted downstream.

(f) Fault-occurrence notification by OAM cell for VC connections

When notification of the occurrence of a line fault has been given by an NVP-connection OAM cell, it is required that occurrence of the fault be communicated downstream. FIG. 17 is a diagram useful in describing the generation of a VC-connection OAM cell for giving notification of fault occurrence.

(1) The OAM processor 37 receives the NVP-connection OAM cell (NVP-AIS), which gives notification of the occurrence of line failure. (2) Upon receiving this cell, the OAM processor 37 sets to "1" the fault-status indication bit AIS of the VP-connection management table indicated by the degenerate VPI (=n) of this OAM cell.

Under these conditions, (3) the RDI cell generator 145a increments the address n of the connection management table 41a successively and reads out the connection management data. (4) Next, the RDI cell generator 145a obtains the degenerate VPI (=m) contained in this connection management data, reads the NVP management data (line number #5) out of the storage area of the NVP-connection management table 141a indicated by this degenerate VPI and (5) determines whether the fault-status indication bit AIS is "1". If the fault-status indication bit AIS is "0", the AIS cell for the VC/VP connections is not generated. However, if the fault-status indication bit AIS is "1", notification of occurrence of line fault #5 is given by the NVP-connection OAM cell. In such case the RDI cell generator 145a generates and transmits the OAM cell VC-AIS, which is for the VC/VP connection, having the ICID value as n and #5 as the line number TAGD.

(g) PM processing

When the NVP connection has been established, the OAM processor 37, which implements the performance management function (PM function), executes VC-connection performance management and performance management of an NVP connection which accommodates this VC connection. When an NVP connection has been established, there are cases where the performance management of the VC connection and the performance management of the NVP connection which accommodates this VC connection start simultaneously. In such cases it is required that PM processing be executed simultaneously with regard to each type of performance management. In order to implement such a performance management function, the present invention is so adapted that, as shown in FIG. 18, the PME bit indicating the validity of the performance management function and PM-ID for accessing the PM management table 41b are set in both the connection management table 41a and the NVP-connection management table 141a. Further, the degenerate VPI is provided in the management data of the connection management table 41a so that both of the management tables 41a, 141a can be accessed when a user cell is received.

When a user cell having a prescribed ICID (=n) arrives under these conditions, the OAM processor 37 reads the PM validity bit PME, the PM-ID (e.g., 83) and the degenerate VPI (=m) out of the area of the connection management table 41a addressed by the ICID. If the PM validity bit PME is "1", then the OAM processor reads data out of the area of PM management table 41b indicated by the PM-ID (=83) and executes prescribed PM processing. If the PM validity bit PME is "0", then PM processing is not executed.

Next, the PM validity bit PME and PM-ID (=12) are read out of the area of the NVP-connection management table 141a indicated by the degenerate VPI (=m). If the PM validity bit PME is "1", then the OAM processor reads data out of the area of PM management table 41b indicated by the PM-ID (=12) and executes prescribed PM processing. If the PM validity bit PME is "0", then PM processing is not executed.

Thus, if the PM validity bit PME of connection management table 41a or NVP-connection management table 141a is "1", then the corresponding type of PM processing is executed. If the PM validity bit PME is "1" in both of these management tables, then both types of PM processing can be executed.

The foregoing relates to a case where the line-number/VPI is converted to a degenerate VPI. However, conversion to the degenerate VPI is not always necessary. In such case the address of the NVP-connection management table 141a would be a value which is obtained by combining the line number and VPI. Further, though the foregoing relates to ATM cells, the cells are not necessarily limited to ATM cells but may be any types of cells.

In accordance with the present invention as described above, data necessary for OAM processing of each line is managed unitarily with a connection management table using an identifier ICID for internal processing, and OAM processing is executed using data read from the connection management table based upon the internal-processing identifier ICID that has been added onto the OAM cell received from each line. As a result, a plurality of lines can be controlled commonly by a single OAM processor and an increase in amount of hardware can be suppressed by reducing the capacity of the connection management table.

In accordance with the present invention, empty cells are generated, on a per-line basis, in periods in which valid cells are absent, a line identifier is added onto the empty cell and the cell is inserted into an ATM cell stream. When an OAM cell is sent to a prescribed line by OAM processing, the empty cell having the line identifier of this line is discriminated from the cell stream and the OAM cell is inserted at the position of the empty cell. As a result, OAM processing that has an awareness of the line can be executed efficiently.

In accordance with the present invention, an identifier is added onto the header of an empty cell generated by removing the overhead field of a signal that enters from a line, and insertion of an OAM cell at the position of the empty cell having this identifier is inhibited. As a result, the band will not be exceeded at each of the lines even if OAM cells are inserted.

In accordance with the present invention, OAM processing can be executed using the internal-processing ICID and degenerate VPI even in a case where an NVP connection and a VC connection are subjected to OAM processing individually. Moreover, the capacities of the management tables can be reduced and an increase in the amount of hardware can be suppressed.

In accordance with the present invention, a line fault of which notification has been given by an NVP-connection OAM cell can be communicated downstream beyond the range of the NVP connection.

As many apparently widely different embodiments of the present invention can be made without departing from the spirit and scope thereof, it is to be understood that the invention is not limited to the specific embodiments thereof except as defined in the appended claims.

What is claimed is:

1. An OAM processing method in a plural-line terminating apparatus for accommodating a plurality of lines, converting signals from these plurality of lines to cells and sending the cells to a switch, sending cells from the switch to lines upon converting the cells to line signals, and executing OAM processing of the plurality of lines, said method comprising the steps of:

multiplexing cells onto a cell stream after signals which enter from each of the lines are converted to the cells, and adding onto a cell header of each cell a line identifier that specifies the line on which this cell arrived;

converting a combined identifier, which is a combination of the line identifier and a cell connection identifier that have been added onto a cell, to an internal-processing identifier and sending the cell having the internal-processing identifier to the switch side;

unitarily managing data, which is necessary for OAM processing of each line, by a first management table using the internal-processing identifier as an address;

reading data from said first management table based upon the internal-processing identifier of a cell received from each line; and executing OAM processing conforming to each line using the data that has been read.

2. The method according to claim 1, further comprising the steps of:

generating, on a per-line basis, an empty cell in a period in which a valid cell is absent, adding a line identifier onto the empty cell and inserting the empty cell into the cell stream;

when an OAM cell is sent to a prescribed line by OAM processing, discriminating the empty cell, which has the line identifier of this line, from the cell stream; and inserting the OAM cell at the position of said empty cell.

3. The method according to claim 2, further comprising the steps of:

adding the line identifier onto a header of the empty cell generated by removing an overhead field of a line signal that enters the plural-line terminating apparatus from a line; and inhibiting insertion of the OAM cell at the position of the empty cell having said identifier.

4. The method according to claim 1, wherein in a case where a network VP connection (NVP connection) is established for a prescribed line between adjacent switches in order to manage the line and OAM cells for the NVP connection are sent and received between the switches and management of this line is executed, the method further includes the steps of:

providing a second management table addressed by a combination of a VPI of an OAM cell for the NVP connection and line identifier;

storing data necessary for OAM processing of the NVP connection in the second management table;

determining whether a cell is the OAM cell for the NVP connection; and if the cell is the OAM cell for the NVP connection, executing OAM processing of the NVP connection using data read from the second management table based upon the combination of the VPI and line identifier that have been added onto the OAM cell of the NVP connection.

5. The method according to claim 1, wherein in a case where a network VP connection (NVP connection) is established for a prescribed line between adjacent switches in order to manage the line and OAM cells for the NVP connection are sent and received between the switches and management of this line is executed, the method further includes the steps of:

providing a second management table addressed by a degenerate VPI obtained by converting a combination of a VPI of an OAM cell for the NVP connection and line identifier;

storing data necessary for OAM processing of the NVP connection in the second management table;

determining whether a cell is the OAM cell for the NVP connection; and if the cell is the OAM cell for the NVP connection, converting the combination of a VPI of the OAM cell and the line identifier to the degenerate VPI; and executing OAM processing of the NVP connection using data read from the NVP-connection management table based upon the degenerate VPI.

6. The method according to claim 5, further comprising the steps of:

providing the second management table with an area for storing fault occurrence status of the NVP connection corresponding to the degenerate VPI;

providing the first management table with an area for storing the degenerate VPI corresponding to the internal-processing identifier;

when notification of a fault in the NVP connection is given by an OAM cell for the NVP connection having a prescribed degenerate VPI value, storing an indication of fault occurrence in the fault-status storage area of the second management table that corresponds to the degenerate VPI value;

determining whether indication of fault occurrence has been recorded in the fault-status storage area of the second management table;

if indication of fault occurrence has been stored in the fault-status storage area designated by the prescribed degenerate VPI value, obtaining an address of the first management table at which said degenerate VPI value is stored in a degenerate-VPI indication area; and generating the OAM cell for fault notification having said obtained address as the an internal-processing identifier, and sending this OAM cell downstream.

7. A plural-line terminating apparatus for accommodating a plurality of lines, converting line signals from these plurality of lines to cells, sending the cells to a switch, sending cells from the switch to lines upon converting the cells to line signals, and executing OAM processing of the plurality of lines, comprising:

a first signal converter for format-converting a line signal, which enters from each line, to cells, subsequently multiplexing the cells onto a cell stream, and adding a line identifier, which specifies the line on which the cell arrived, onto a cell header of the cell;

a header converter for converting a combined identifier, which is a combination of the line identifier and a connection identifier that have been added onto a cell, to an internal-processing identifier, and sending the cell having the internal-processing identifier to the switch side;

a header back-converter for converting the internal-processing identifier of each cell in the cell stream that has entered from the switch side back to the line identifier and the connection identifier;

a second signal converter for demultiplexing the cell stream based upon the line identifier, converting the demultiplexed cells to a line signal and sending the signal;

a first management table for unitarily managing data necessary for OAM processing of each line through use of the internal-processing identifier; and an OAM processor for executing OAM processing using the data that has been read from said first management table based upon the internal-processing identifiers of cells that have been received from each of the lines.

8. The apparatus according to claim 7, wherein said first signal converter includes means for generating, on a per-line basis, an empty cell in a period in which a valid cell is absent, adding the line identifier onto the empty cell and inserting the cell into the cell stream; and said OAM cell processor has:
    means which, when an OAM cell is sent to a prescribed line by OAM processing, is for discriminating an empty cell having the line identifier of this line from the cell stream; and
    means for inserting the said OAM cell at the position of this empty cell.

9. The apparatus according to claim 8, wherein said first signal converter has means for adding the identifier onto a header of the empty cell generated by removing an overhead field of the line signal that enters from the line; and said OAM processor has means for inhibiting insertion of an OAM cell at the position of the empty cell having said identifier.

10. A plural-line terminating apparatus for accommodating a plurality of physical lines, converting line signals from these plurality of physical lines to cells, sending the cells to a switch, sending cells from the switch to lines upon converting the cells to line signals, and executing OAM processing of the plurality of lines, comprising:

means for converting a line signal, which enters from each physical line, to cells, subsequently multiplexing the cells onto a cell stream, and adding a line identifier, which specifies the physical line on which the cell arrived, onto a cell header of the cell;

storage means for storing a combined identifier, which is a combination of the line identifier and a connection identifier that have been added onto the cell, in association with data necessary for cell processing of each physical line;

means for reading data from said storage means based upon the combined identifier of cell that has been received from each of the physical lines; and means for executing cell processing conforming to each physical line using the data that has been read.

* * * * *